US006704794B1

(12) United States Patent
Kejriwal et al.

(10) Patent No.: US 6,704,794 B1
(45) Date of Patent: Mar. 9, 2004

(54) CELL REASSEMBLY FOR PACKET BASED NETWORKS

(75) Inventors: Prabhas Kejriwal, Palo Alto, CA (US); Chi Fai Ho, Sunnyvale, CA (US)

(73) Assignee: Nokia Intelligent Edge Routers Inc., Mountain View, CA (US)

( * ) Notice: Subject to any disclaimer, the term of this patent is extended or adjusted under 35 U.S.C. 154(b) by 0 days.

(21) Appl. No.: 09/518,662

(22) Filed: Mar. 3, 2000

(51) Int. Cl.[7] .............................................. G06F 15/16
(52) U.S. Cl. ........................ 709/236; 370/392; 370/474
(58) Field of Search ......................... 709/236; 370/474, 370/397, 395, 398, 392, 359

(56) References Cited

U.S. PATENT DOCUMENTS

| 5,311,509 A | * | 5/1994 | Heddes et al. .............. 370/397 |
| 5,329,623 A | * | 7/1994 | Smith et al. ................. 713/201 |
| 5,537,403 A | | 7/1996 | Cloonan et al. |
| 5,745,488 A | * | 4/1998 | Thompson et al. .... 370/395.31 |
| 5,781,549 A | * | 7/1998 | Dai .............................. 370/398 |
| 5,794,073 A | | 8/1998 | Ramakrishnan et al. |
| 5,831,980 A | | 11/1998 | Varma et al. |
| 5,841,772 A | | 11/1998 | Daniel et al. |
| 5,841,874 A | * | 11/1998 | Kempke et al. ............. 713/160 |
| 5,892,761 A | * | 4/1999 | Stracke, Jr. ............... 370/395.1 |
| 5,999,518 A | | 12/1999 | Nattkemper et al. |
| 6,046,677 A | | 4/2000 | Kavanagh |
| 6,088,355 A | * | 7/2000 | Mills et al. .................. 370/392 |
| 6,122,274 A | | 9/2000 | Kumar |
| 6,147,996 A | | 11/2000 | Laor et al. |
| 6,173,386 B1 | | 1/2001 | Key et al. |
| 6,259,699 B1 | * | 7/2001 | Opalka et al. ............... 370/398 |
| 6,310,893 B1 | * | 10/2001 | Yuan et al. .................. 370/474 |
| 6,324,164 B1 | * | 11/2001 | Luijten et al. ............... 370/230 |
| 6,377,574 B1 | * | 4/2002 | Endo ........................... 370/359 |
| 6,377,583 B1 | | 4/2002 | Lyles et al. |
| 6,389,031 B1 | | 5/2002 | Chao et al. |
| 6,421,342 B1 | | 7/2002 | Schwartz et al. |
| 6,426,957 B1 | | 7/2002 | Hauser et al. |
| 6,510,509 B1 | * | 1/2003 | Chopra et al. ................. 712/13 |
| 2002/0010793 A1 | | 1/2002 | Noll et al. |
| 2002/0099855 A1 | | 7/2002 | Bass et al. |

* cited by examiner

*Primary Examiner*—Nabil Elhady
(74) *Attorney, Agent, or Firm*—Blakely, Sokoloff, Taylor & Zafman LLP

(57) ABSTRACT

A cell processing pipeline is described having a plurality of stages for cell reassembly. The cell has a cell header and a cell payload. One of the stages is configured to parse packet header information located within the cell payload.

77 Claims, 14 Drawing Sheets

CELL REASSEMBLY FOR PACKET BASED NETWORKS

CROSS REFERENCE TO RELATED APPLICATIONS

The following related patent applications are hereby cross-referenced, which are assigned to the same assignee as the present patent application: 1) U.S. patent application Ser. No. 09/914,728, filed Oct. 14, 1999, entitled "Method and Apparatus for Input Rate Regulation Associated With A packet Processing Pipeline" by Prabhas Kejriwal and Chi Fai Ho, 2) U.S. patent application Ser. No. 09/418,683, filed Oct. 14,1999, entitled "Method and Apparatus For Output Rate Regulation And Control Associated With A Packet Pipeline" by Prabhas Kejriwal and Chi Fai Ho, 3) U.S. patent application Ser. No. 09/418,690, filed Oct. 14,1999, entitled "Method and Apparatus For An Output organizer" by Prabhas Kejriwal and Chi Fai Ho.

FIELD OF THE INVENTION

The field of invention relates to networking technology in general; and more specifically, to cell reassembly technology for packet based networks.

BACKGROUND

Various approaches may be used to model the functional layers that exist within a system that implements a node within a network. FIG. 1a shows one such model for a networking system 100. Packets are sent over network lines 101a–x. Network lines 101a–x correspond to the physical wiring (such as copper cables or fiber optic cables) that emanate from the system 100. Network lines 101a–x are used to physically carry input traffic (i.e., traffic entering system 100) and output traffic (i.e., traffic leaving system 100) from/to other networking systems.

Line aggregation layer 102 is used to aggregate the input traffic from network lines 101a–x and segregate the output traffic to network lines 101a–x. An input port (e.g., input port 103a) is used to carry aggregated input traffic from one or more network lines. For example, input port 103a may be used to carry the input traffic only from network lines 101a, b. Thus each input port 103a, b, c is a logical structure that carries the traffic arriving to system 100 from the port's corresponding network lines.

The number of network lines that correspond to a particular input port may vary depending upon the design and/or configuration of a particular system 100. Also, one or more input ports (e.g., input ports 102,b,c) may exist, depending on the design point of a particular system. In an analogous fashion, line aggregation layer 102 is also used to segregate all the output traffic to network lines 101a–x. As such each output port 104a,b,c is a logical structure that carries the traffic leaving systen 100 from the logical port's corresponding network lines.

Packet aggregation layer 105 is used to form input packets from the input traffic on input ports 103a, b, c and effectively send output packets over the output traffic existing on output ports 104a,b,c. Various packet forms may be implemented at packet aggregation layer 105. For example, for Asynchronous Transfer Mode (ATM) related network lines 101a–x, AAL0 and AAL5 packet types may be recognized at packet aggregation layer 105. Similarly, packets associated with the Point to Point Protocol, HDLC, Frame Relay and Ethernet may be used, as is known in the art, among others not listed above as well.

As an example of the operation of the packet aggregation layer 105, assume that network lines 101a–x are ATM network lines carrying AAL5 packets with ATM cells. ATM cells correspond to the traffic on network lines 101a–x and input/output ports 102-c103a–c, 104a–c. Packet aggregation layer 105 forms AAL5 input packets in the input direction (i.e., cell reassembly) and breaks down AAL5 output packets in the output direction (i.e., cell segmentation).

Within networking/transport Layer 106, as shown in FIG. 1, an input packet is converted into an output packet. Input packets are presented to the networking/transport layer 106 by the packet aggregation layer 105 and output packets are presented to the packet aggregation layer 105 by networking/transport Layer 106. Networking/transport layer 106 is responsible for effectively identifying the networking node that an input packet should be transmitted over when it leaves the system 100 as an output packet.

The bandwidth associated with system 100 is related to the number of packets per second the networking/transport layer 106 can process as well as the number of packets per second the packet aggregation layer can present/receive to/from the networking/transport layer 106.

FIG. 1b shows an example of a packet 152 that may be processed by system 100 of FIG. 1a. As seen in FIG. 1b, a packet 152 may be divided into header information 150 and random customer data 151. Header information 150 is used by the network to properly transport the packet. The packet header 150 typically has information related to the source of the packet, the destination of the packet, the priority of the packet, etc. In many cases the packet header 150 may be viewed as a collection of various headers such as a transport layer header, a networking layer header, etc. The packet random customer data 151 is the information desiring transportation across the network (e.g., an e-mail note, a file, a voice over IP (VOIP) telephone conversation or portions thereof). The random customer data 151 begins in an Internet Protocol (IP) packet after the IP header 153 as seen in FIG. 1b. The IP header includes an internet layer header and may also include a transport layer header and/or application layer header.

SUMMARY OF INVENTION

A cell processing pipeline is described comprising a plurality of stages for cell reassembly. The cell has a cell header and a cell payload. One of the stages is configured to parse packet header information located within the cell payload.

Other features and advantages of the present invention will be apparent from the accompanying drawings and from the detailed description that follows below.

BRIEF DESCRIPTION OF THE DRAWINGS

The present invention is illustrated by way of example, and not limitation, in the Figures of the accompanying drawings, like references indicate similar elements and in which:

FIG. 2 shows an environment for the packet aggregation layer of FIG. 1a.

FIG. 5a shows a methodology for the cell processing pipeline of FIG. 4a.

DETAILED DESCRIPTION

A cell processing pipeline is described having a plurality of stages for cell reassembly. The cell has a cell header and a cell payload. One of the stages is configured to parse packet header information located within the cell payload.

Figure 1A:
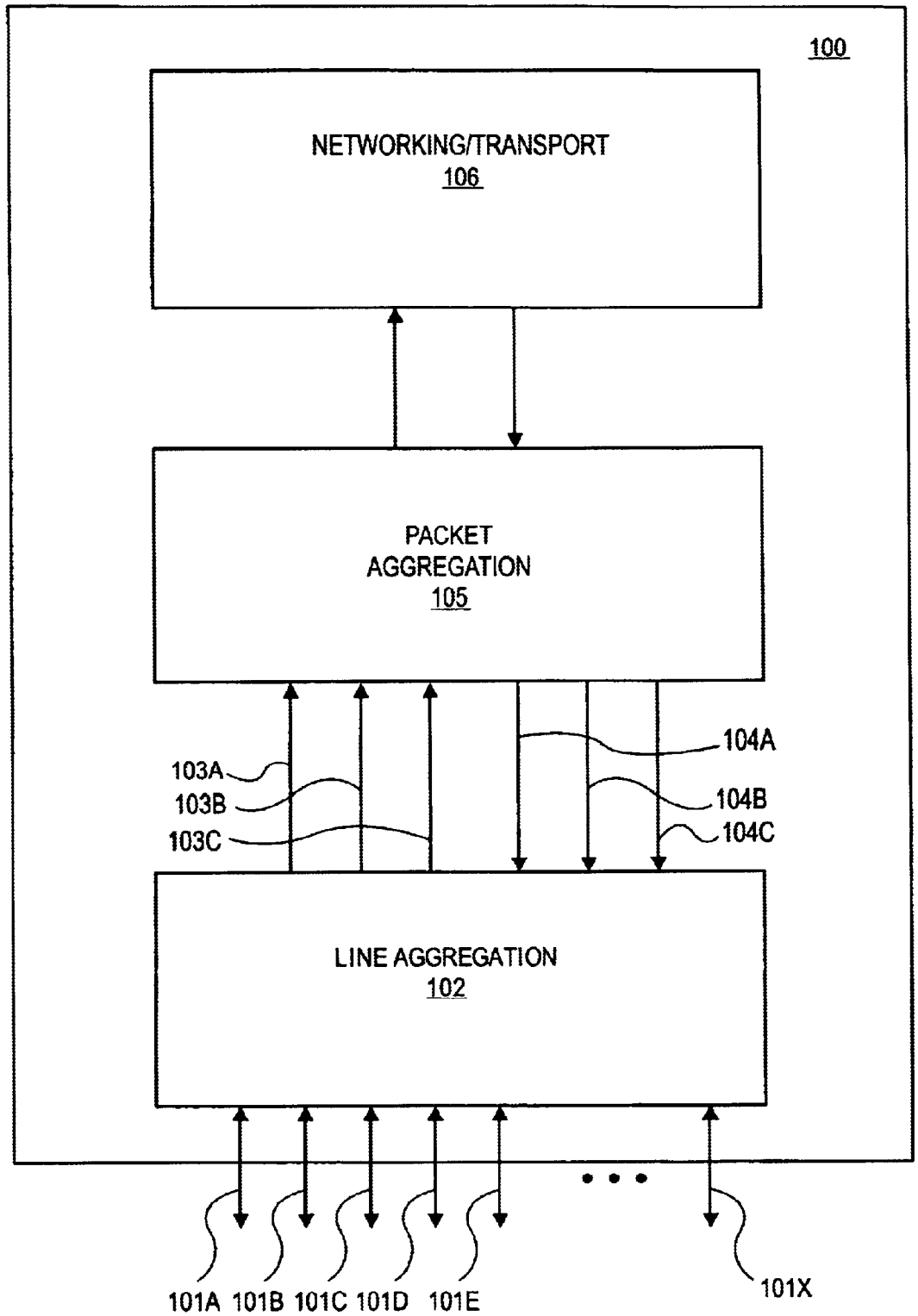
FIG. 1a shows a networking system model (prior art).
Figure 1B:
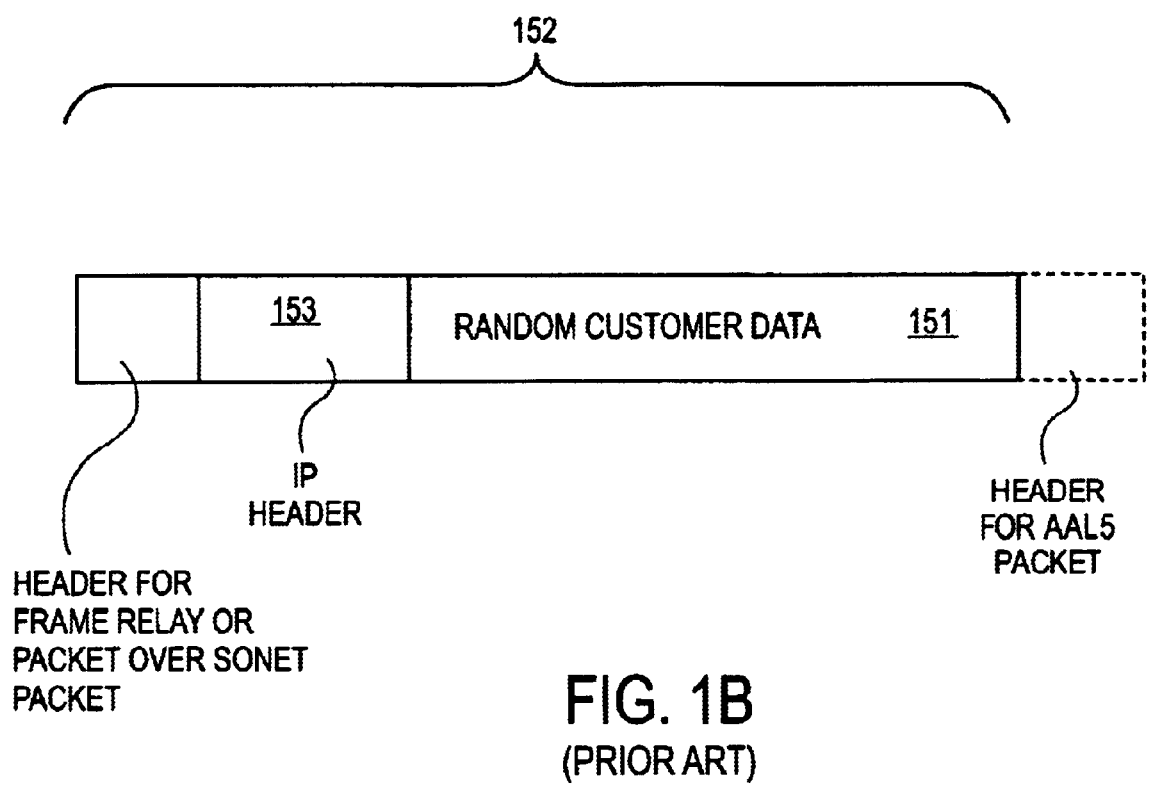
FIG. 1b shows a packet (prior art).
Figure 2:
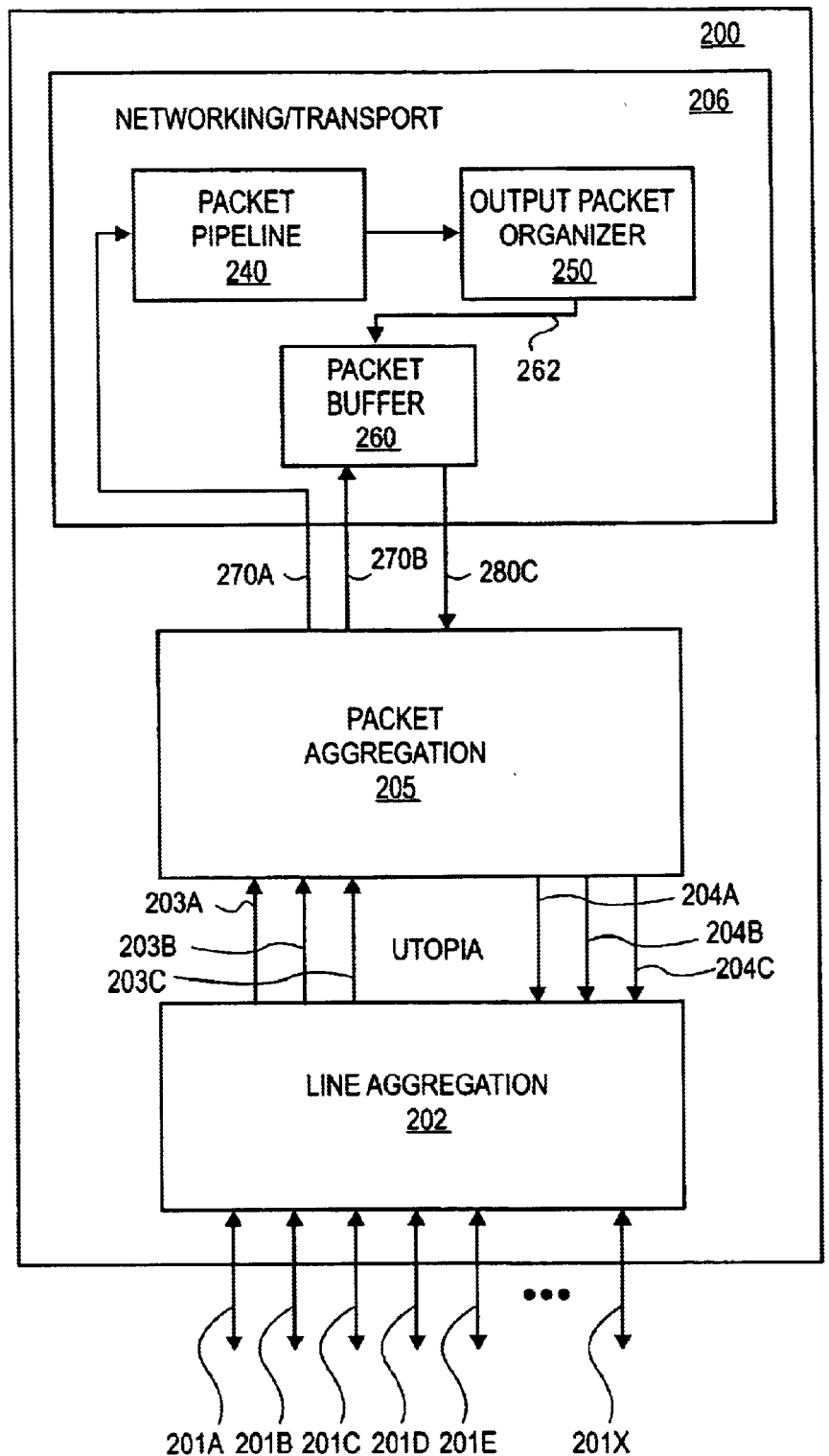

FIG. 2 shows a more detailed depiction of one embodiment for the packet aggregation layer 105 of FIG. 1. With respect to the interface between the line aggregation 202 and packet aggregation 205 layers, ports 203a,b,c and 204a,b,c may be implemented with a version of the Universal Test and Operations PHY Interface for ATM (UTOPIA) interface (such as POS-PHY based products from PMCSierra Corporation, Inc. of British Columbia, Canada or UTOPIA Compatible Enhanced Interface based products from Lucent Technolgies, Murray Hill, N.J.). More details related to UTOPIA based interfaces are discussed ahead.

For various interfaces between the line 202 and packet 205 aggregation layers (such as a UTOPIA based interface), cells may be passed across port lines 203a,b,c and 204a,b,c. Cells are data structures having a header and a payload. Cells are used to transport sections of a packet through a system and (such as in the case of ATM cells) are also frequently used to transport sections of a packet through a network. The cell's header is control information that is passed along with the cell's payload. The cell's header is typically used to indicate the particular packet that the cell payload belongs to (among other possible uses such as indicating where the cell payload belongs within the packet). The cell's payload carries the section of the packet being transported by the cell. Note that an individual cell's payload may carry a packet's random customer data, a packet's header or both depending on what section of the packet the cell's payload carries.

Physical network lines 201a through 201x may carry various forms of physical layer format (e.g., SONET, DS3, T1, etc.). Line aggregation layer 202 is typically responsible for: 1) converting information from/to a cell based format (at the interface with the packet aggregation layer 205) to/from the appropriate physical layer format; and 2) integrating/segregating lines 201a–x to/from ports 203a,b,c/204a,b,c.

Although the following discussion is limited to a UTOPIA based implementation, other interface approaches may be implemented between the line aggregation layer 202 and the packet aggregation layer 205 (e.g., PCI bus, CSIX bus as well as proprietary solutions) to transport cells. The invention should therefore not be construed as limited solely to UTOPIA based approaches.

With respect to the interface to networking/transport layer 206, note that in the particular embodiment of FIG. 2 the networking transport layer 206 has a packet processing pipeline 240, an output packet organizer 250 and a packet buffer 260.

Other embodiments, however, may implement the approaches discussed herein with other networking/transport layer 206 approaches such as switching architectures (e.g., a crossbar or Banyan switch) or routing architectures (e.g., a general purpose processor coupled to a memory that implements networking/transport layer 206 functionality with software). In the particular approach of FIG. 2, the packet processing pipeline 240 determines how quickly a packet should be passed through system 200, while the output packet organizer 250 holds "packet identifiers" consistent with the determination made by the packet processing pipeline 240.

The type of information processed by packet processing pipeline 240 and entered into output packet organizer 250 is typically control information not random customer data. For example, information located within the various headers associated with a packet (along with other control information as discussed below) is directed to packet processing pipeline 240 from packet aggregation layer 205. Packet aggregation layer 205 is therefore typically designed to extract or copy a packet's header information for presentation to the packet processing pipeline 240.

FIG. 2 symbolically indicates such a scheme by the use of two inputs 270a and 270b. In the embodiment of FIG. 2, packet processing pipeline input 270a carries control information to the packet processing pipeline 240 while packet buffer input 270b carries a packet's random customer data to the packet buffer 260. The packet buffer input 270b may also be designed to carry the packet header information so that it may be stored along with the packet random customer data.

Toward the output of pipeline 240, the placement of a packet identifier into a specific location within the output packet organizer 250 affects when the packet will be released from packet buffer 260. That is, output packet organizer 250 has locations that correspond or otherwise correlate to the time at which a packet is released from packet buffer 260. A packet identifier is any data structure that refers to (or may be used to refer to) a packet stored in packet buffer 260. An example is a memory pointer that indicates where a packet may be found in a memory device used to implement packet buffer 260

When a packet identifier within output packet organizer 250 is processed, the release of the associated packet from the packet buffer 260 is triggered. This triggering is represented by release line 262. Release line 262 is any address line, control line or other logic used to release a packet from packet buffer 260. An example includes memory address lines used to set up a memory read to retrieve the corresponding packet from a packet buffer 260 memory location. Releasing a packet from the packet buffer 260 results in the random customer data associated with the released packet being sent along packet buffer output 280c to packet aggregation layer 205 for outbound transmission.

Thus, in the particular example of FIG. 2 for incoming packets, the packet aggregation layer 205 is responsible for reassembling cells (that arrive from UTOPIA based input ports 103a,b,c) into packets by properly recognizing which incoming cells belong to which inbound packet. For each packet to be processed by the networking/transport layer 206, the packet aggregation layer 205: 1) presents the networking/transport layer 206 (along input 270a) with the control information used by the pipeline 240 (or other networking/transport layer means) for the particular packet; and 2) places the packet random customer data (with or without packet header information depending upon designer choice) into packet buffer 260. This activity may be referred to generally as cell reassembly.

A discussion of an embodiment of the control information that is passed from the packet aggregation layer 205 to the networking/transport layer 206 along input 270a immediately follows.

Pipeline Control Label

As discussed with reference to FIGS. 1a and 2, the packet aggregation layer 105, 205 performs cell reassembly in the inbound direction (i.e., toward pipeline 240). Associated with this activity, packet aggregation layer 105, 205 presents (directly or indirectly) control information to the packet processing pipeline 240 and stores packets (with or without its header) into the packet buffer 260.

In an embodiment, once the packet aggregation layer 205 recognizes a complete packet has fully arrived to system 200 and is suitable for further processing by the networking/transport layer 206, the packet aggregation layer 205 forwards control information to the pipeline 240. Up to and before this time, however, the packet aggregation layer 205 continually stores cells (or just the cell payload) that belong to the packet into the packet buffer memory 260. That is, as the packet's cells arrive to system 200 they are stored in the packet buffer 260. Note that in such an embodiment, packet header information is stored along with the packet's random customer data in the packet buffer memory 260 since at least one cell payload will carry packet header information.

Figure 3:
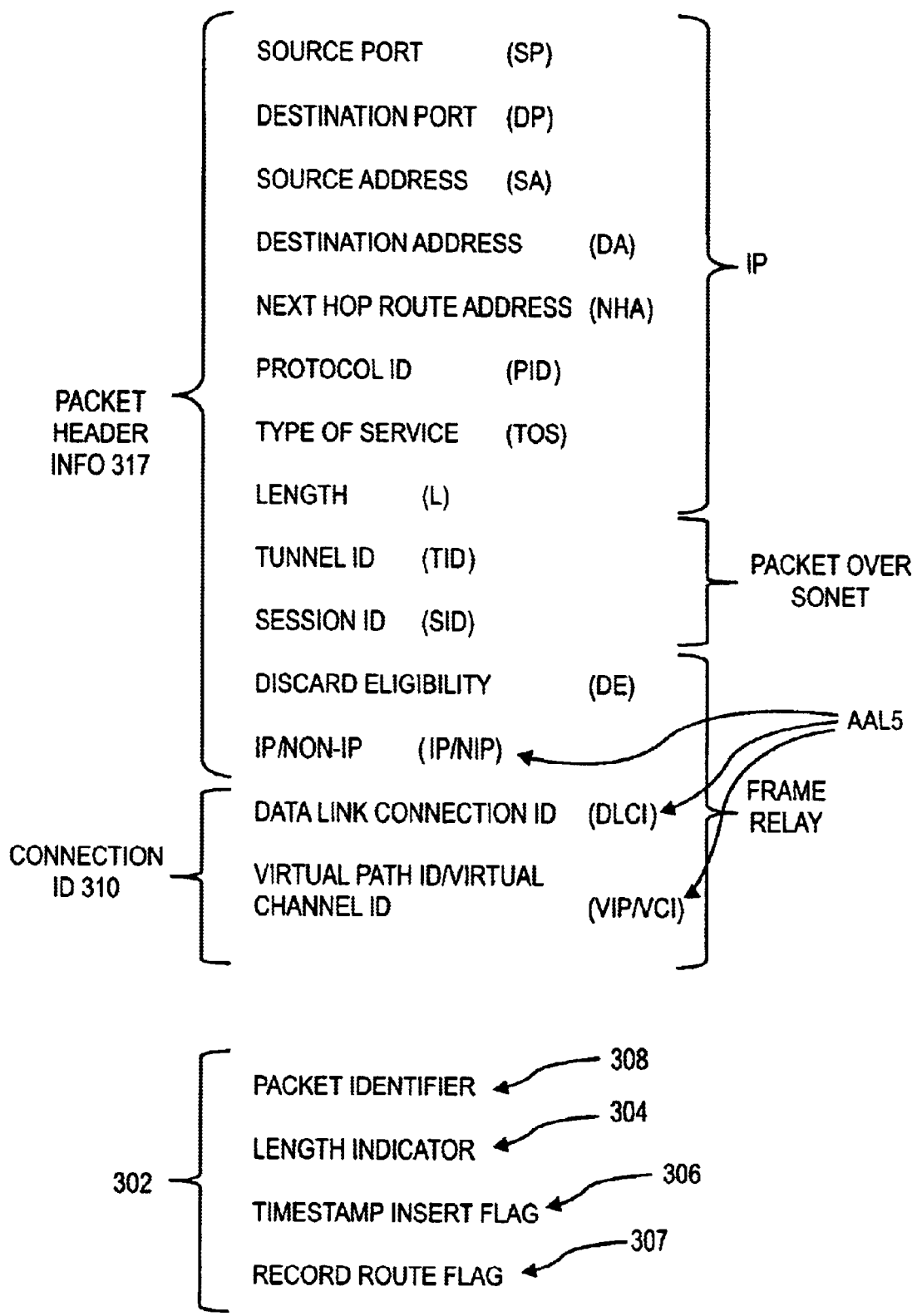
FIG. 3 shows an embodiment of a control label that is forwarded from the packet aggregation layer of FIG. 2 to the packet processing pipeline of FIG. 2.

After the last cell associated with a particular packet is recognized, the packet aggregation layer 205 forwards the control information associated with the newly arrived packet (which may also be referred to as an input packet) to the pipeline 240. FIG. 3 shows one embodiment of control information 395 that is passed from the packet aggregation layer 205 to the packet processing pipeline 240.

The control information 395, which may also be referred to as a pipeline control label 395 or control label 395, is updated as a packet is effectively processed by the packet processing pipeline 240. Note that in this embodiment, the information 395 includes information 317 located within the various headers associated with the input packet or the cells used to carry the input packet, as well as information 302 that is calculated by the packet aggregation layer 205 or line aggregation layer. This calculated control information 302 may be referred to as a control header.

The embodiment 395 of FIG. 3 may be used for an Internet Protocol version 4 (IPv4) application as well as other Internet Protocol (IP) based applications. As shown in FIG. 3, the packet header information 317 may at least partially include: 1) Source Port Address (SP); 2) Destination Port Address (DP); 2) Source Address (SA); 3) Destination Address (DA); 5) Next Hop Route Address (NHA); 6) Protocol ID (PID); 7) Type of Service (TOS); and 8) Length (L). The relevance of the packet header information 317 is apparent to those who practice in the art. Other embodiments may include packet header information not listed in FIG. 3. The calculated control information 302, in the embodiment of FIG. 3, includes a packet identifier 308, a length indicator 304 (also referred to as packet size), a time stamp insert flag 306 and a record route flag 307.

The packet identifier 308 indicates where a packet is located in the packet buffer memory (260 of FIG. 2). As discussed previously, the pipeline 240 eventually stores the packet identifier 308 into an output packet organizer 250 location. In various embodiments, packets may be stored in buffer memory 260 as "link lists" of cells or other forms of a packet fragment. Storing a packet as a link list involves storing a small piece of the packet into buffer memory 260 along with a data value that corresponds to a memory pointer where the next small piece of the packet is found. Since ATM technology employs ATM cells to break packets into smaller pieces, in various ATM related embodiments, each small piece of the packet stored at a memory location may correspond to one or more ATM cells.

For example, if thirty ATM cells are needed to transport a packet, thirty packet buffer 260 memory locations may be used to individually store each of the thirty cells. In such a link list embodiment, since each memory location also has a pointer to the next cell (along with a cell), the packet identifier stored in the output packet organizer need only have a memory pointer to the first cell used to carry the packet. In such embodiments, the packet aggregation layer 205 is responsible for calculating the memory pointer that is stored with each cell including the memory pointer corresponding to the first cell (e.g., the packet identifier 308).

The length indicator 304 indicates how large the packet is. A user's rate consumption may be measured by the size of the input packet. In order to facilitate a pipeline's rate regulation function(s) (if any), the packet aggregation layer 206 in the embodiment of FIG. 2 presents the packet processing pipeline 240 with an indication 304 of the size of the packet. The corresponding units may vary from embodiment to embodiment. For example, some embodiments may choose to present Length Indicator 304 as a number of cells. Others, again as an example, may choose to present Length Indicator 304 as a number of bytes. In another embodiment it is measured as a number of buffers where a buffer is a collection of cells. Again, the packet aggregation layer is responsible for calculating the length indicator.

The Connection ID 310 indicates which line or connection (note that multiple connections may exist on a line) the input packet arrived in on. Thus, the Connection ID 310 may contain or be derived from similarly indicative information such as a DLCI address (for Frame Relay), a VPI/VCI address (for ATM based transportation such as AAL5), or a MAC Address (for Ethernet or other IEEE 802.x or IEEE standard based transportation). Other information may also be used such as the port (203a,b,c of FIG. 2) that the packet is coming from. An address or other identifier used only internal to the system may also be used to for the Connection ID 310. In such embodiments, the Connection ID may be more properly regarded as within the calculated control information 302.

An example of a use for the Connection ID 310 is to understand whether an input packet is arriving from a user for entry to a service provider's network; or from a service provider on an internal line. Correspondingly, the Connection ID 310 may be used to help determine which input rate regulation should be applied to an input packet. Note that the networking/transport layer would use the connection ID 310 in this manner. As discussed in more detail ahead, the packet aggregation layer can use the Connection ID to determine which packet (of the plurality of packets sent to the system) a particular cell belongs to.

The Timestamp Insert flag 306 indicates a need to timestamp the packet when it is transmitted to the next system in the network. This is used to address the route/timestamp record option in the IP header. The Record Route flag 307 indicates a need to record the system's IP address in the outgoing packet. This is used to address the route record option in the IP header.

Thus to summarize, in the inbound direction, the cell reassembly functions of the packet aggregation layer 205 may include: 1) continually storing arriving cells (or at least the random customer data within the cell payloads) into packet buffer memory; 2) extracting or copying header information from an arriving packet; 3) calculating or otherwise determining certain control information (such as the Length Indicator and Connection ID) used by the networking/transport layer; and 4) recognizing the last cell of a packet and then forwarding the control information (including the packet header) to the networking transport layer.

Cell Header

Figure 4A:
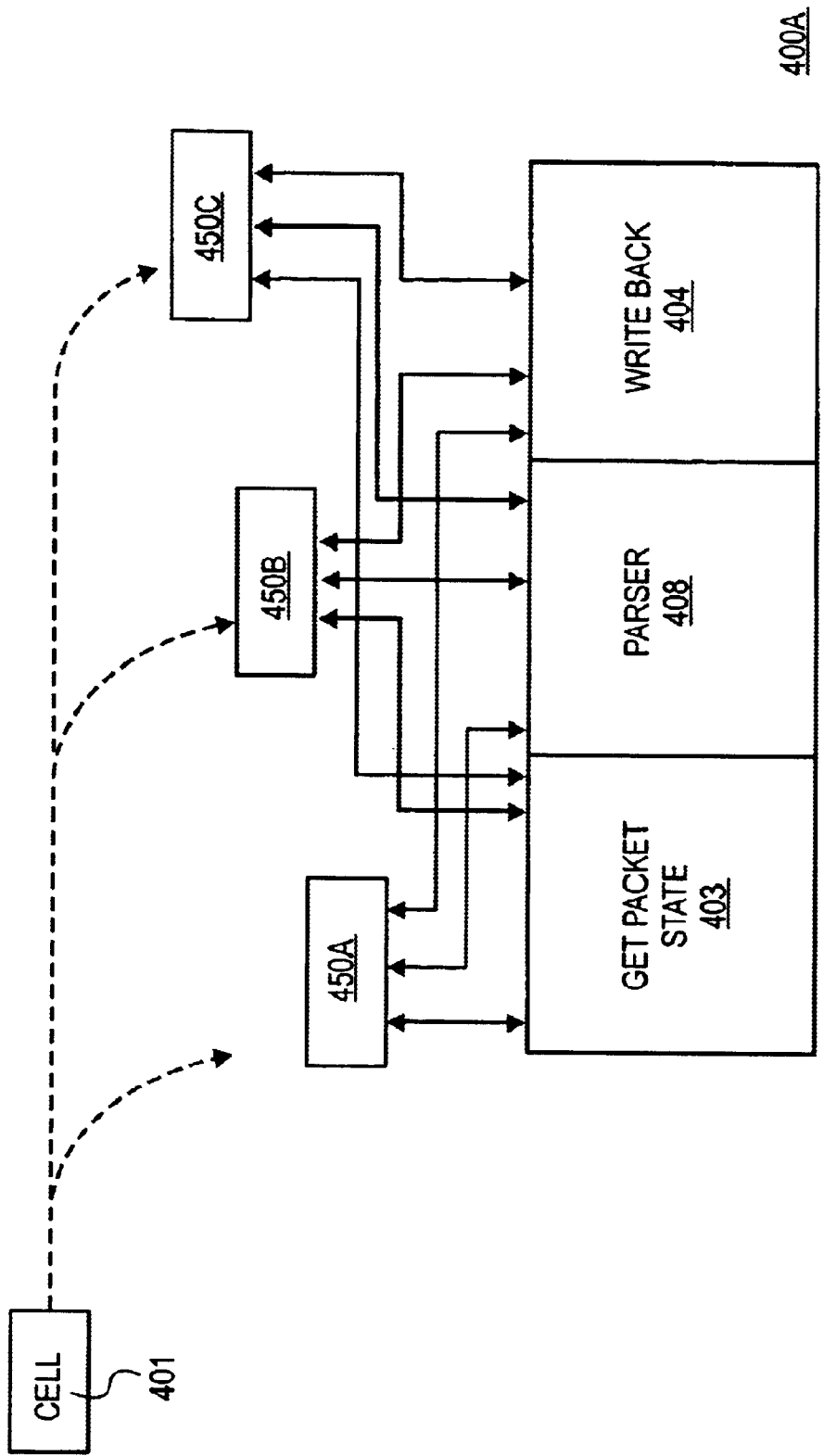
FIG. 4a shows a high level depiction of a cell processing pipeline.

FIGS. 4a, 4b, and 5a, 5b show the above described packet reassembly function at varying degrees of detail. However, before describing the reassembly function, an embodiment of the input presented to the reassembly function is first described. Note, however, that a pipeline architecture is used to perform the cell reassembly function. Referring to FIGS. 4a, b and 5a, b a cell comprising cell header information 401a, 501a and a cell payload 401b, 501b is presented to a cell processing pipeline 400 that processes the arriving cell 401a,b 501a,b.

The cell processing pipeline may therefore be configured to handle different cell formats. A cell format is a particular arrangement of cell header and cell payload information. Different cell formats may be handled by a single pipeline by adopting a cell header 401a, 501a data structure at the pipeline input that has fields for all information that may appear amongst the various supported cell formats. Those fields that do not apply to a particular cell format (e.g., an ATM cell header field for a Packet Over SONET cell format) are not used for the particular cell being processed.

In an embodiment the cell header 401a, 501a includes the contents of an ATM cell header (to support cells arriving in an ATM cell format), a Start of Packet (SOP) field, an End of Packet (EOP) field, a Packet Type field and a Port Number field. These are discussed below. A cell header 401a, 501a such as that described above may be available from a UTOPIA based interface or may be constructed by the designer if his/her UTOPIA based interface (or other interface) does not construct cell headers according to this approach.

If the SOP bit is active, the cell 401a,b, 501a,b at the pipeline input is the first cell of an incoming packet. The SOP bit may be used by the cell processing pipeline 400 to properly identify where a packet's header information starts and where a packet's random customer data begins. For example, consider an exemplary packet where the first 56 bytes are consumed by header information.

In an embodiment where the cell payload 401b, 501b has 48 bytes, the first 8 bytes of the payload associated with 2nd cell (in the sequence of cells used to transport the exemplary packet) marks the transition from the packet's header to the packet's random customer data. Note that different packet types such as Frame Relay, POS or AAL5 can have different transition mark locations.

Thus the SOP and Packet Type information within the datafield 402 can be used to start a counter within cell processing pipeline 400. The Packet Type field indicates the type of packe,t the cell belongs to (e.g., AAL5, Packet Over SONET or Frame Relay). The counter increments until the location of the packet header/data transition (for each specific type of packet being transported) is reached. Since many packets start with header information, cell payload 401b, 501b information processed by the pipeline 400 prior to the packet header/data transition are identified by. pipeline 400 as being associated with the packet's header information 317 of FIG. 3.

Some packet types, such as AAL5 packets, have packet header information located at the trailing end of the packet. The cell processing pipeline 400 may be designed to recognize a trailing packet data/header transition by searching for a flag with the last cell's header or by counting as described above. Associated with parsing is the ability to identify the information within a cell's payload as being either packet header information or the packet's random customer data. Parsing is extracting, copying or otherwise obtaining individual segments of information within the packet header from a cell's payload. Parsing is performed by the parser stage 408 within the cell processing pipeline 400 of FIGS. 4a,b and is described in more detail ahead.

Note that the SOP bit is not usually associated with a pure (i.e., non-enhanced) UTOPIA interface. A pure UTOPIA interface generally provides little more than Start of Cell and End of Cell information and is more properly associated only with the line aggregation layer 102, 202 of FIGS. 1 and 2. However, an enhanced UTOPIA interface solution may provide information indicative of the start of a packet such as an SOP bit.

Various cell processing pipeline 400 embodiments may have varying degrees of functionality depending upon the amount of functionality used to create the cell header 401a, 501a that precedes the cell processing pipeline 400. For example, in embodiments where little functionality is performed prior to the pipeline 400, the cell header may have limited information. As such, the pipeline 400 should be designed to implement lacking functions. For example, the pipeline may be designed to identify the SOP (and/or EOP) for all supported packet types if a pure UTOPIA interface is employed.

For embodiments having more robust functionality prior to the cell processing pipeline 400 (e.g., SOP is identified prior to the pipeline 400 for all supported packet formats such as AAL5, Frame Relay, Packet Over SONET, etc.), the cell header will have comparatively more information and the pipeline 400 may be devoid of the prior functions. Correspondingly, for embodiments having intermediate functionality prior to the cell processing pipeline 400 (e.g., SOP is identified prior to pipeline 400 for some supported packet formats such as Frame Relay or Packet Over SONET but not other supported packet formats such as AAL5), the pipeline 400 can include the lacking functionality for the packet types that need it. In the cell reassembly embodiment of FIGS. 4a,b and 5a,b, functions that create the cell header 401a, 501a beyond just SOP identification are performed. These include End of Packet (EOP) identification, Packet Type identification and Port Number identification functions.

The EOP bit identifies whether the cell 401a,b, 501a,b is the last cell of an incoming packet. In an embodiment, the EOP bit is used by the cell processing pipeline 400 to indicate that the pipeline control label (395 of FIG. 3) of the packet associated with cell 401a,b, 501a,b should now be sent to the packet processing pipeline 240 of FIG. 2. That is, the EOP bit marks the presence of a fully arrived packet that is ready for processing by networking/transport layer 206 of FIG. 2.

Note that packet processing pipeline 240 of FIG. 2 can be designed to support Layer 2 flows as well as Layer 3 flows. For Layer 2 flows, packet processing pipeline 240 of FIG. 2 regulates and/or controls the delay experienced by a packet within system 200 without reference to information within the IP header of FIG. 3 (e.g., by referring only to Connection ID 310). For Layer 3 flows, cell processing pipeline 400 of FIG. 4 may avoid use of the EOP bit by counting until the length of the packet (as identified by the LENGTH parameter in the IP header of FIG. 3) is reached.

In order to support Layer 2 flows, however, the cell processing pipeline 400 is typically designed to ignore IP header information and therefore should make use of some indication (e.g., the EOP bit) that a packet has fully arrived. In one embodiment, for simplicity, the cell processing pipeline 400 makes use of the is EOP bit regardless if the current packet is associated with a Layer 2 or Layer 3 flow.

Cell header 401a, 501a may also contain the Packet Type parameter. The Packet Type parameter indicates the type of packet associated with the cell 401a,b 501a,b (e.g., AAL5, Packet Over SONET, Frame Relay, etc.). The Packet Type parameter is used by the cell processing pipeline 400 to run various functions that are specific to the type of packet being processed. For example, properly identifying the packet header/data transition within a Frame Relay packet AAL5 packet or Packet Over SONET packet.

The Port Number indicates which port (203a–c of FIG. 2) the packet arrived on. The Port Number may be used (in a manner similar to VPI/VCI information for AAL packets carried by ATM cells and DLCI for Frame Relay packets) to help determine the particular packet that the cell belongs to.

Cell Reassembly Overview

Figure 4B:
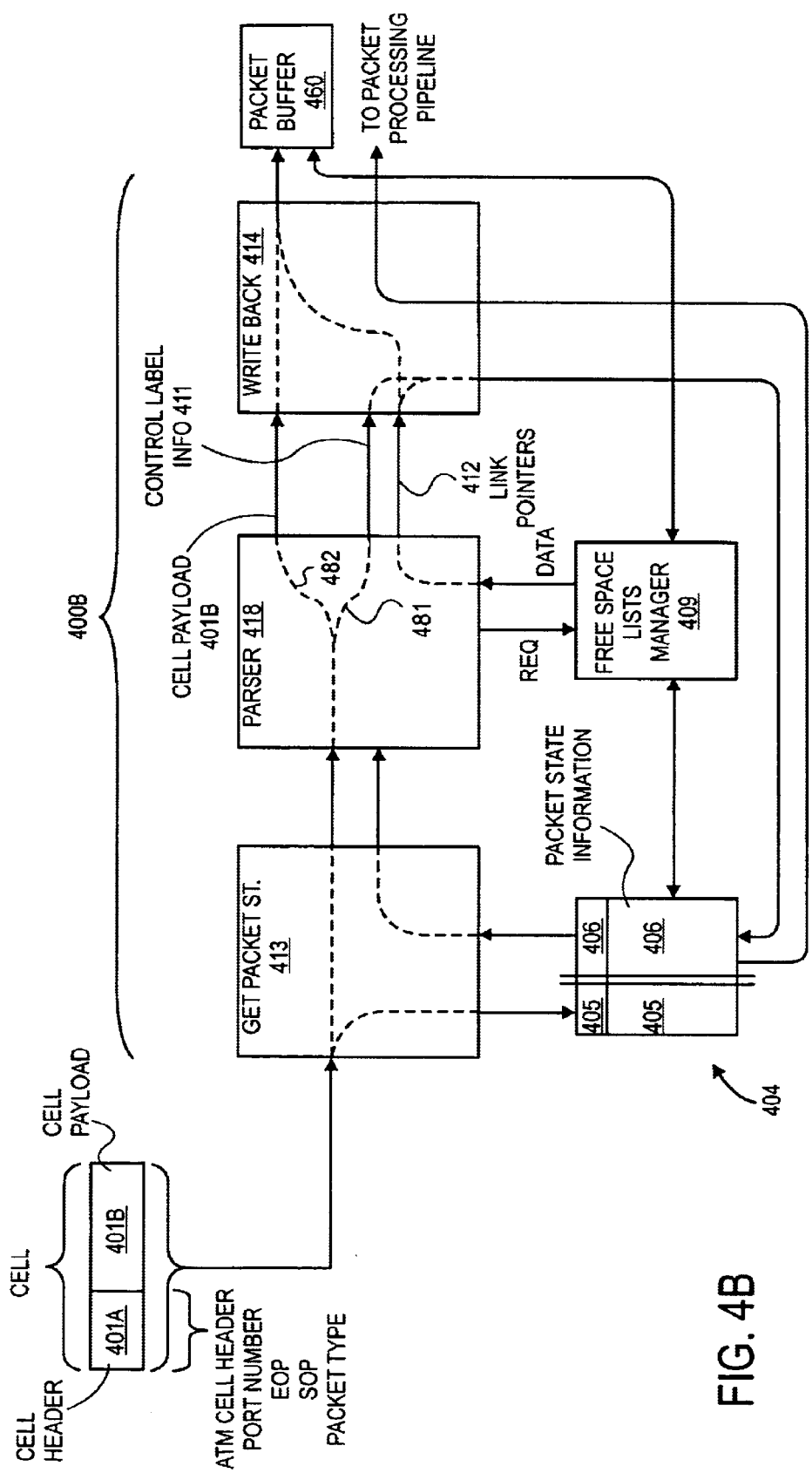
FIG. 4b shows a more detailed embodiment of a cell processing pipeline.
Figure 5A:
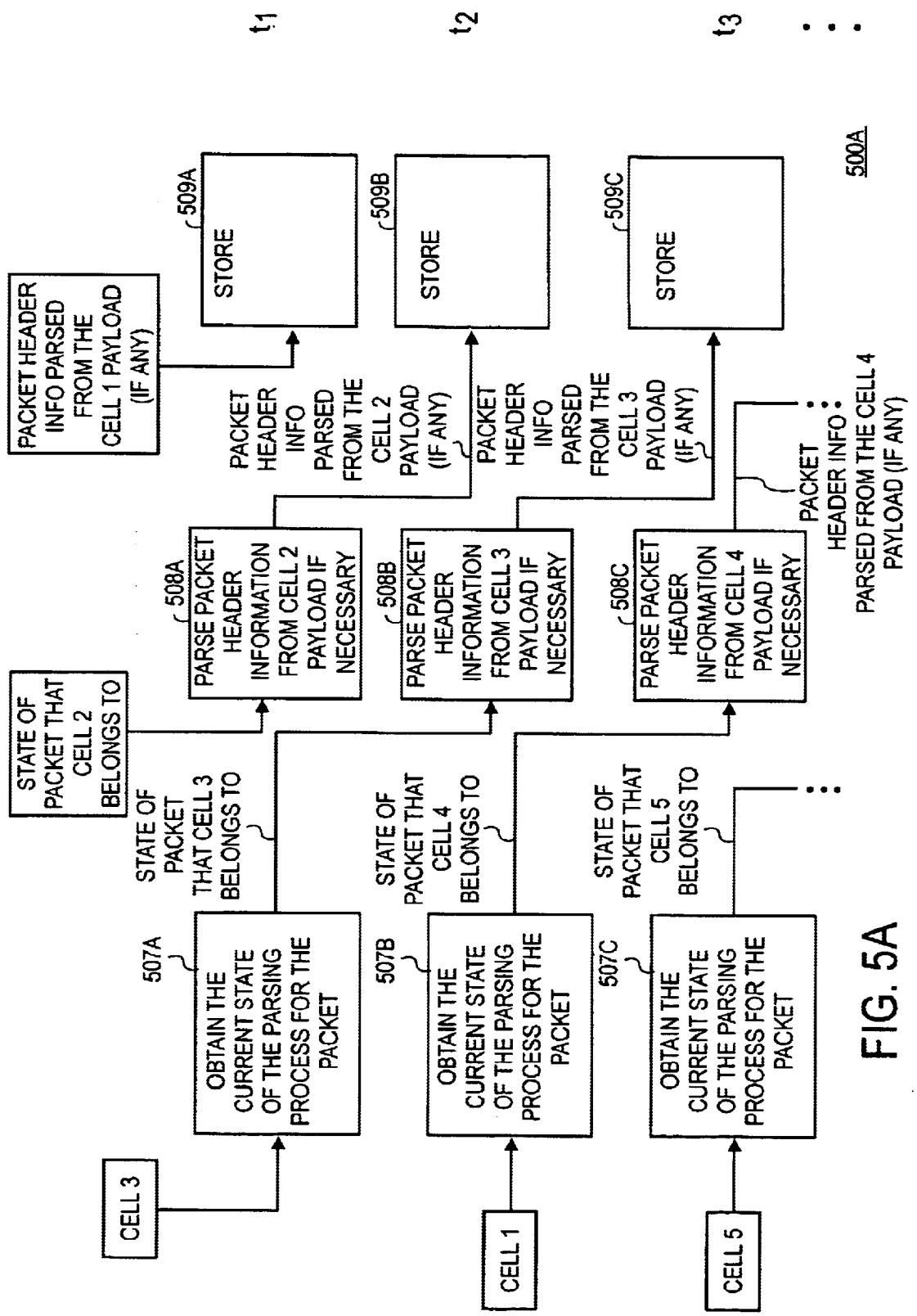
Figure 5B:
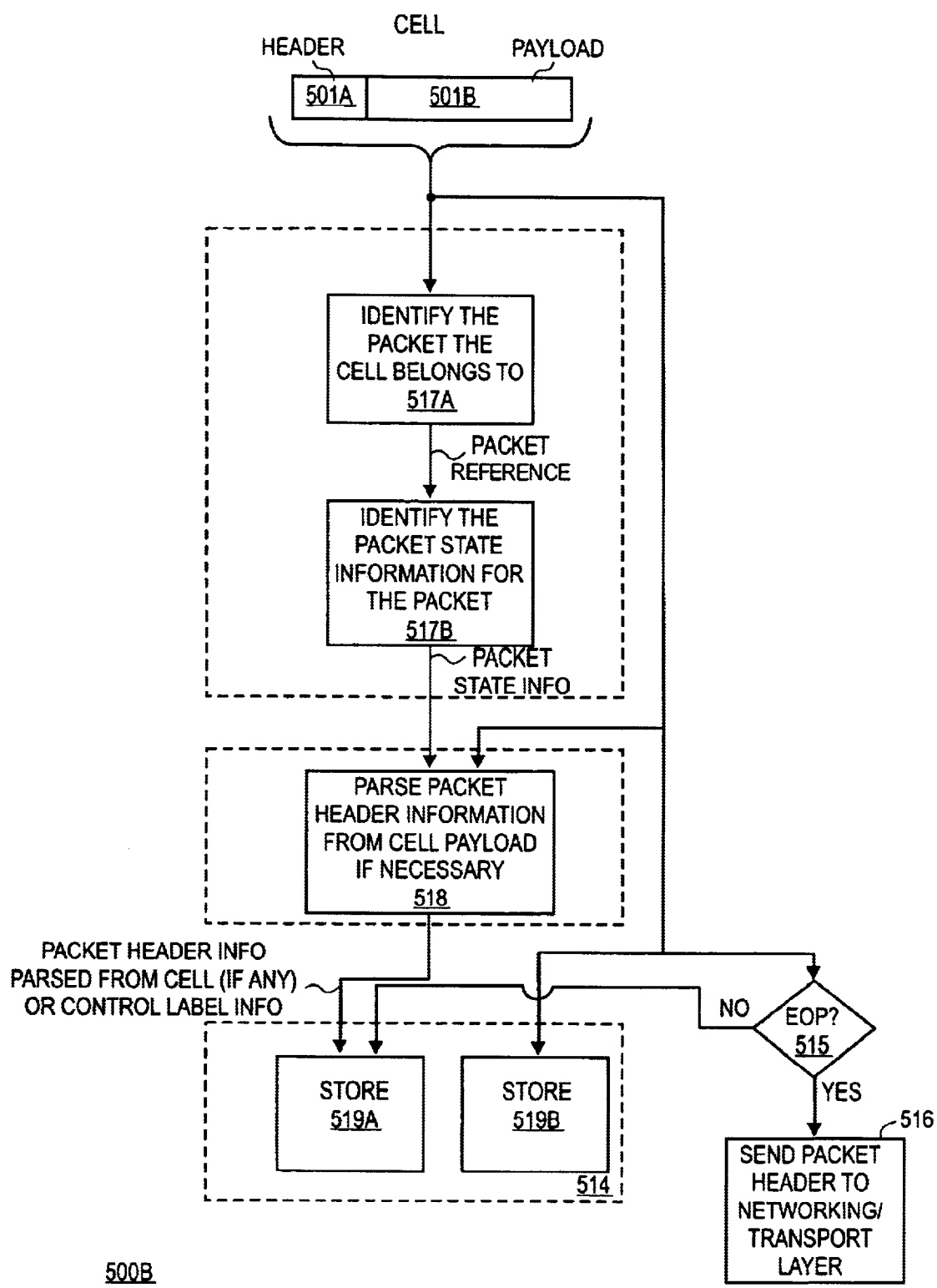
FIG. 5b shows a methodology for the cell processing pipeline embodiment of FIG. 4b.

FIGS. 4a and 5a display, at a higher level of abstraction, the architecture and methodologies shown in FIGS. 4b and 5b. FIG. 4a shows a pipeline approach where a pipeline stage, referred to as a Parser stage 408, is able to distinguish packet header information from packet random customer data within the cell payload processed by the Parser stage 408.

The Parser stage 408 makes this distinction so that the packet may be parsed. Recall that parsing is the activity of extracting or copying or otherwise obtaining packet header information located within the cell payload. Parsed packet header information is forwarded to the networking/transport layer so the packet may be properly handled (e.g., handled according to Layer 3 and Layer 4 services).

Prior to the Parser stage 408 is a Get Packet State stage 403 that obtains the state of the packet that the cell being processed by the Get Packet State stage 403 belongs to. The state of the packet is information indicative of the amount of parsing that has been performed (or remains to be performed) on a particular packet. Examples include the number of cells or payload bytes that have already been processed for a particular packet.

Following the Parser stage 408 is a Write Back stage 404. The Write Back stage 404 may be used to store parsed packet header information into an appropriate location (such as a memory device) from where it may be directed to the networking/transport layer. However, the exact handling of parsed packet header information may vary from embodiment to embodiment. For example, some embodiments may be configured to direct parsed packet header information directly to the networking/transport layer rather than store it in a memory device beforehand.

As mentioned above, the stages 403,408,404 are implemented within a pipeline. A pipeline enables different stages to operate simultaneously on different cells. For example, in the three stage embodiment of FIG. 4a, the Write Back stage 404 operates on first cell while Parser stage 408 operates on a second cell and while Get Packet State stage 403 operates on a third cell. Simultaneously operating on three cells enhances the throughput of the reassembly function.

Note that there are also registers 450a,b,c coupled to each stage 403, 408, 404. The registers 450a,b,c are configured to hold a cell (as well as other control information) being processed by the pipeline 400. A cell is processed by the pipeline by being accessed to each stage in succession. For example, a cell in a register is first processed by the Get Packet State stage 403; then the Parser stage 408; and then the Write Back stage 404. Coupling each register 450a,b,c to each stage 403, 408, 404 allows this progression without moving the cell from a register once it is offered to the pipeline 400.

Once a cell is fully processed by the pipeline 400 (that is, once the processing progression through the pipeline 400 is completed for a particular cell), the fully processed cell may be overwritten or otherwise replaced in its corresponding register by a new cell 401 offered to the pipeline. In high offered cell rate conditions, input cells 401 tend to immediately replace fully processed cells in their corresponding register. A stream of input cells may be entered into the registers 450a,b,c, in a round robin fashion.

FIG. 5a shows the pipelining activity 500a associated with the pipeline 400a of FIG. 4a. In FIG. 5a, cell 1 arrives to the pipeline prior to cell 2, cell 2 arrives to the pipeline prior to cell 3, etc . . . Within a time t1 in which the pipeline stages simultaneously perform their respective operations: 1) packet header information parsed from the cell 1 payload (if any) is stored 509a into an appropriate location as discussed above; 2) packet header information (if any) within the payload of cell 2 is parsed 508a in light of the state of the packet that cell 2 belongs to; and 3) the state of the packet is obtained 507a for the packet that cell 3 belongs to. The sequence is repeated over the following time periods t2, t3, etc . . . with cells effectively moving forward in the pipeline for each new time period. Note FIG. 5a shows the full processing 507a, 508b, 509c for cell 3 over time periods t1, t2, t3.

It is important to note that embodiments other than three stage pipelines are possible. For example, the Get Packet State stage 403 may be divided into a plurality of stages. Also, the Write Back stage 404 may be configured to store parsed packet header information into different types of locations (such as a memory device or a register). As discussed ahead, the Write Back stage 404 may also be configured to store the cell payload into buffer memory. The Write Back stage 404 may be divided into a plurality of stages or may be removed from the pipeline.

FIGS. 4a, 4b and 5a, 5b respectively show a cell processing pipeline architecture 400a, 400b and related methodology 500a, 500b for cell reassembly.

Referring to the more detailed embodiments of FIGS. 4b and 5b, the cell processing pipeline 400b accepts as an input an incoming cell 401a,b, 501a,b. The cell header 401a includes information (e.g., ATM cell header (if the cell is an ATM cell) SOP, EOP, Packet Type and Port Number) that may be used to is identify the packet to which the cell belongs. In this embodiment, the SOP, EOP, Packet Type and Port Number parameters are produced by functionality that precedes the cell processing pipeline 400b.

The first stage 413 in, the cell processing pipeline 400 embodiment of FIG. 4b, referred to as the Get Packet State stage 413, obtains information relating to the packet partially transported by cell 401a,b, 501a,b. This information, referred to as packet state information, indicates the extent to which the parsing process has been completed for the particular packet that cell 401a,b, 501a,b belongs to. More details about the contents of the packet state information 406 are discussed further ahead.

As shown in FIG. 4a, the packet state information may be obtained by using information within the cell header 401a, 501a (e.g., the VPI/VCI address for packets carried by ATM cells) as an input parameter 405 to a look up table 404 that stores the packet state information 406. Information indicative of the network line or the port the packet arrived on (201a–x or 203a–c of FIG. 2) may also be used as a lookup parameter. Thus, the port number is a possible lookup table 404 input parameter. The cell 401a,b, 501a,b, along with the packet state information 406, 506 are then made available to the Parser stage 418.

As discussed in more detail ahead, the lookup associated with the Get Packet State stage 413 may be divided into a pair of processes. A first process identifies 517a the packet that the cell belongs to (as seen in FIG. 5b) and a second process identifies 517b the packet state information based upon the packet reference produced by the first process. In one embodiment the packet reference is the Connection ID 310 of FIG. 3. Since packets arrive in sequence along a connection (or other communicative session or channel recognized by the system), packets may be referenced to by the connection used to transport a particular packet. That is, fully arrived packet on a connection will be followed by the next packet on that connection.

The Parser stage 418 is responsible for parsing 518 a packet's header information from a packet's random customer data. The Parser stage 418 may also calculate or otherwise obtain the information 302 within control label 395 of FIG. 3 that is not associated with the cell or packet header information (317 of FIG. 3) such as the packet identifier 308 and length indicator. Thus in this embodiment, a function of the Parser stage 418 is to help create control label information 411 (in the form 395 presented in FIG. 3).

Recall that both packet header information (e.g., the IP information within control label 395 of FIG. 3) and random customer data carried by the packet may be found in the cell's payload 401b, 501b. The Parser stage 418 uses the packet state information 406, 506 and/or cell header information 401a, 501a to understand which bytes within cell payload 401b, 501b correspond to the packet's header information and which bytes within cell payload 401b, 501b correspond to the packet's random customer data.

Depending on which cell (in the sequence of cells used to transport the packet) that cell 401a,b, 501a,b corresponds to, the cell payload 401b, 501b may be: 1) entirely random customer data; 2) a mixture packet header information and random customer data; or 3) entirely packet header information. For example, the first cell of a packet typically carries only packet header information while cells used to transport the middle sections of a packet typically carry only random customer data. Each of these three cases is discussed immediately below.

In the first case the Parser stage 418 will determine that the cell is carrying only random customer data. Packet header information is therefore not present within payload 401b, 501b. In this case, parsing is not necessary as there is no information within the cell payload used to build control label 395 of FIG. 3. Assuming no calculated parameters (e.g., the Length Indicator 304 of FIG. 3) are to be determined, the cell payload 401b, 501b is simply made available to the Write Back stage 414. Note that since no control label information is produced by the parser stage 418 in this case, no control label information 411 is passed toward the Write Back stage 414.

In the second case the Parser stage 418 will determine that the cell payload 401b, 501b is carrying a mixture of packet header information and random customer data. Here, parsing is necessary and the Parser stage 418 extracts or copies the packet header information within the cell payload 401b, 501b. The packet header information is subsequently made available to the Write Back stage 414 as Control Label information 411. This parsing activity 518 made by the Parser stage 418 is shown schematically in FIG. 4 as separated lines 481 and 482.

In this same case, note that the cell payload 401b, is made available to the Write Back stage 414. Also as discussed in more detail below, the Parser stage 418 can calculate other control label parameters from the cell 401a,b, 501a,b (such as the Length Indicator 304, Timestamp Insert Flag 306 and Record Route Flag 307 of FIG. 3) which may be similarly made available to the Write Back stage 414 as Control Label information 411.

In the third case, the Parser stage 408 determines the cell payload 401b, 501b is carrying only packet header information. Random customer data is therefore not present in the cell and the cell payload is transported to the Write Back stage 414 entirely as Control Label information 411. The payload 401b is also made available to the Write Back stage 414. Since the entire payload 401b is forwarded to the Write Back stage in all cases, this Parser stage embodiment 418 copies rather than extracts packet header information from the cell payload 401b, 501b. Other embodiments may extract the packet header information which forces random customer data (within the cell payload 401b) to be forwarded from the parser stage 413 to the Write Back stage 414.

When the Write Back stage 414 obtains access to the Control Label information 411 and cell payload data information 401b, the Write Back stage 414 stores 519a, 519b these data structures to their corresponding memory locations. As discussed with respect to FIG. 2, cell payload 401b is stored 519b in packet buffer memory (also referred to as buffer memory or packet buffer) 260. Buffer memory 260 in FIG. 2 is shown in FIG. 4 as packet buffer 460. Control Label information 411 is stored along with the packet state information 406 in lookup table 404.

In order to store 519a, 519b these data structures, however, the Write Back stage 414 needs to identify a proper memory address for both the Control Label information 411 and the cell payload 401b. In the pipeline 400b embodiment of FIG. 4b, free memory spaces within packet buffer 460 and lookup table 404 are monitored and listed in the free space lists manager 409. The free space lists manager 409 is coupled to the packet buffer 460 and lookup table 404 to fetch, maintain an awareness of and/or control the free memory locations within these devices 460, 404.

In one embodiment, the free space lists manager 409 organizes free memory spaces as sets of a plurality of free memory addresses. For example, the free space lists manager 409 can hold multiple sets of 20 free addresses for each memory 404, 460. In this and other similar embodiments, the Parser stage 418 is also capable of holding one such set for each memory 404, 460.

Parser stage 418 forwards a free memory address as a link pointer to the Write Back stage 414 as needed. That is, as the Parser stage 418 handles each cell payload 401b, 501b, a packet buffer 460 memory pointer is identified and stored with the cell payload 401b. The Parser stage 418 therefore makes a packet buffer memory 460 link pointer (from its internal list) available to the Write Back stage 414.

Similarly, as the Parser stage 418 identifies control label information within a cell payload 401b, 501b (or otherwise calculates it) the Parser stage 418 makes a control label link pointer (from its internal free memory address list) available to the Write Back stage 414. As either internal list becomes depleted, the Parser stage 418 can request more free link pointers from the free space lists manager 409.

In an embodiment, link pointers 412 made available by the Parser stage 418 (and used for a cell payload 401b) are first stored 519b along with the cell payload 401b before being used as an actual memory addresses. That is, recall from the discussion of FIG. 2 that packets may be stored as linked lists of memory locations having data and a pointer that points to the next memory location of the link list.

In such an approach, a free memory address is used first as a pointer value that is stored 519b with a cell payload 401b and then used second as an actual memory address when the next cell payload for the same packet is stored. In this manner, the first packet buffer 460 location has a pointer value that properly refers to the second packet buffer 460 location. Thus the pointers 412 made available by the Parser stage 418 for cell payloads are first stored with their corresponding data rather than being initially used as an address.

These same link pointer values are then fed back to the packet state information 406 within lookup table 404. The next cell to arrive for the applicable packet will pick up these link pointer values from table 404 (when processed by Get Packet State stage 413),and use them as actual memory addresses (when processed by Write Back stage 414) as its payload information is stored in the packet buffer 460.

The Write Back stage 414 may also check 515 the status of the EOP (End of Packet) value. If the EOP value indicates the cell is the last cell of a packet, the Write Back stage 414 triggers the transmission 516 of the cell's control label (e.g., Control Label 395 of FIG. 3) to the packet processing pipeline. The EOP value, as discussed, may be found in the cell header 401b. For AAL5 packets, the EOP value is found within the cell header of the ATM cell used to carry the packet. For other packets such as Frame Relay or Packet Over SONET packets, the EOP value may be provided by a UTOPIA based interface.

Note that by the time the last cell of a packet is processed by the cell processing pipeline 400, the Control Label 395 of FIG. 3 will be embedded with the cell's packet state information 406 in lookup table 404. That is, since Control Label information 411 identified by the Parser stage 408 is continually fed back to the packet state 406 information within look-up table 404 (as the packet is processed on a cell by cell basis by cell processing pipeline 400), by the time the last cell for a packet arrives, look-up table 404 in many cases has a fully constructed Control Label 395 of FIG. 3.

In cases where the last cell of a packet has Control Label information 411 within its payload 401b, 501b, (such as an AAL5 packet) the Write Back stage 414 can append this new control information to the packet state information 406 (that was retrieved by the Get Packet State stage 413) to form a completed Control Label. This completed Control Label is then forwarded 516 to the networking/transport layer.

If the EOP value indicates the cell is not the last cell of the packet, as discussed, the Write Back stage 414 updates 519a the packet state information 406 within lookup table 404. As discussed in more detail later, new Control Label Information 411 identified by the Parser stage 408 may also be added to look up table 404.

Updating the packet state information 406 includes updating the current state of the parsing process. For example, if a particular packet consumes the first one and half cell payloads with header information; upon processing of the first cell, the Write Back stage 414 will update the packet state information in table 404 indicative of the fact that the first cell of the packet has already been processed. Upon the arrival of the next cell, the Parser stage 408 will be able to use this information to understand that only half of the cell's payload corresponds to control label information 411.

In the case where the last of a packet is processed, the packet state may be updated with a value of "O" or equivalent which indicates the next cell to arrive (for the particular connection) will be the first cell of the next packet. Note that for AAL5 packets, the last cell of the packet may be found by referring to the ATM cell header rather than the EOP value discussed above.

Packet State Stage

Figure 6:
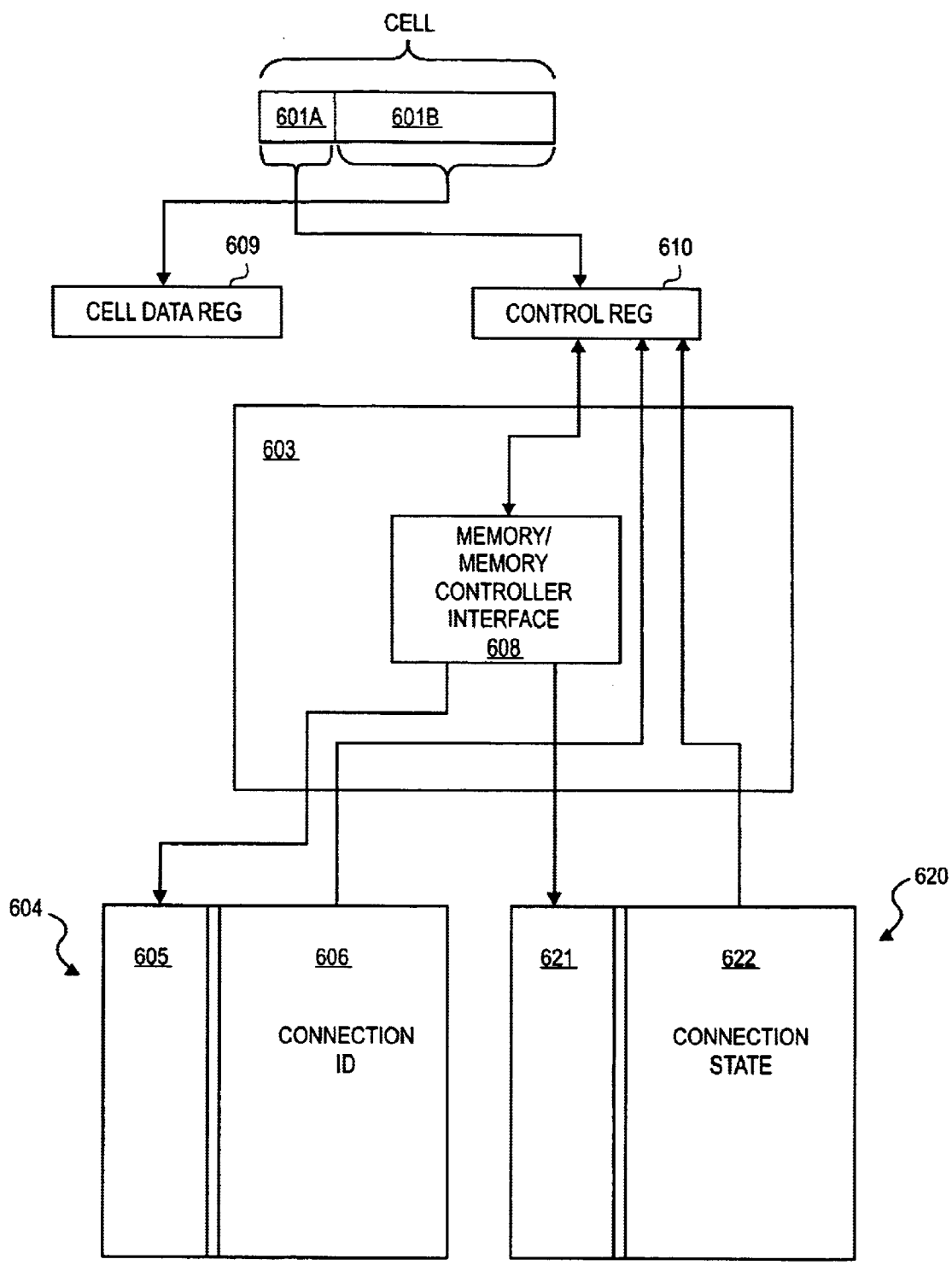
FIG. 6 shows an embodiment of the Get Packet State stage of FIGS. 4a and 4b.

FIGS. 6 through 9 relate to a more thorough discussion of the design and operation for one embodiment of the cell processing pipeline 400 of FIG. 4. FIG. 6 shows a design 603 of the Get Packet State stage 413 of FIG. 4. Note that the input to the pipeline, cell 601a,b, may be separated into a control register 610 and a cell data register 609.

Control register 610 holds control information associated with the processing of the cell 601a,b. This includes the cell's header 601a. The cell's payload 601b is stored in the cell data register 609. Consistent with the design of pipelined architectures, the control register 610 and cell data register 609 are made available to each stage in the cell processing pipeline (e.g., Get Packet State stage 413, Parser stage 418 and Write Back stage 414 of FIG. 4). That is, these registers 609, 610 correspond to a register (such as register 450a) shown in FIG. 4a. Whether one or more registers is used to hold information pertaining to a single cell is up to the designer.

As discussed, the registers allow the pipeline to simultaneously operate on different cells. For example, while a first cell is operated upon by the Get Packet State stage and has access to a first pair of cell data 609 and control registers 610, a second cell is operated upon by the Parser stage which has access to a second pair of cell data and control registers (shown in FIG. 8 as registers 809, 810). Furthermore, simultaneous to the operation of both the Get Packet State stage and the Parser stage, a third cell is operated upon by the Write Back stage which has access to a third pair of data and control registers (shown in FIG. 9 as registers 909, 910). In typical designs, each stage has access to all the registers in the cell processing pipeline so that cell payload information or control information does not have to move from cell data/control register to cell data/control register as each stage performs its operations on the cell.

In the embodiment of FIG. 6, the Get Packet State stage 603 is a memory controller 608 (or an interface to a memory controller positioned between the Get Packet State stage 603 and the lookup tables 604, 620) that is used to perform two lookups. Recall from the discussion of FIG. 4 that the Get Connection stage 403 may be configured to perform a single lookup in table 404. In FIG. 6, however, the lookup activity associated with FIG. 4 has been split into two separate lookups. These are shown in FIG. 5b.

The first lookup 517a involves extracting the cell's header information (e.g., VPI/VCI information for ATM cells or the port number for cells used to carry a Packet Over SONET packet) from the control register 610 in order to identify a packet reference. In this embodiment, the packet reference is a Connection ID parameter 606. The use of a Connection ID as a packet reference was discussed above. The extracted information is presented on the left hand side 605 of a first look up table 604 which has corresponding Connection ID values 606. Connection ID values 606 may be established for each VPI/VCI address, DLCI address, Port Number (or other term that may be used to identify the network line or connection associated with an incoming packet) by networking maintenance or management software (not shown).

The Connection ID value 606 of this embodiment corresponds to internal information used only within the networking system as discussed in relation to FIG. 3. In one embodiment, the performance of the cell processing pipeline is enhanced by use of a Ternary Content Addressable Memory (TCAM) for lookup table 604.

The Connection ID value, once obtained, is then stored into the control register 610 and also used 517b as an input to a second look-up table 620. The second lookup table 620 is referred to as the connection state table 620 and maintains connection state information 622 for each Connection ID value 606. The connection state information 622 includes the packet state information 406 discussed with reference to FIGS. 4a and 4b. The connection state information 622 is then loaded into control register 610 and the Get Packet State stage 603 has completed its operation.

Figure 7:
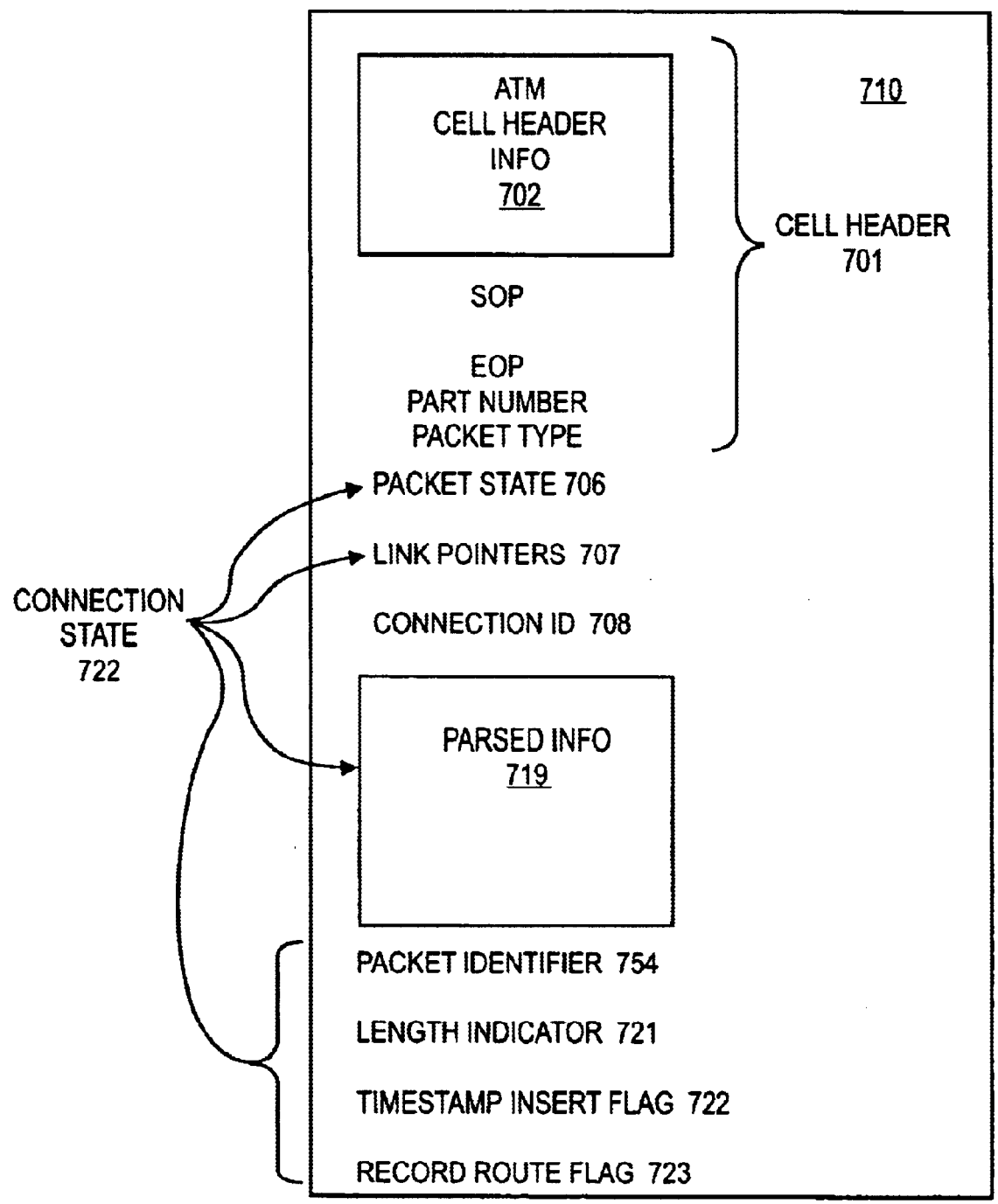
FIG. 7 shows an embodiment of the content of a control register.

FIG. 7 shows the contents of the control register 610 of FIG. 6 after the Get Packet Stage 603 has completed operation for a particular cell. FIG. 7 will also be used as a basis for discussing in more detail the contents of the connection state information 622 of FIG. 6. As is evident from the discussion of the Get Packet state stage of FIG. 6, the Control Register 710 has the cell's header information 701 (601 of FIG. 6) which includes the EOP, SOP port number and Packet Type information as well as contents of the ATM cell header 702 (if the applicable cell is an ATM cell). The control register 710 also has the Connection ID 708 from the first look up executed by the Get Packet State stage.

The connection state information 722 (that was loaded from the connection state table 620 of FIG. 6 into the control register 710) contains the packet state 706, link pointers 707 and parsed information 719. Parsed information 719 is the information that the Parser stage has already identified as being packet header information needed to construct control label 395 of FIG. 3. That is, parsed information 719 corresponds to header information associated with a particular packet that was extracted or copied from cell payloads used to carry a packet, where the cells arrived prior to the cell just processed by the Get Packet State stage.

Connection state information also contains control information for the applicable packet that was calculated by the cell processing pipeline during the processing of the packet's prior cells. This information includes the Packet Identifier 754, Length Indicator 721, Timestamp Insert Flag 722 and Record Route Flag 723. These parameters were discussed with respect to FIG. 3.

Link Pointers 707 correspond to the free memory addresses identified by the Parser stage during the processing of the prior cell for the particular packet at issue. Recall from the discussion of FIG. 4 that the Link Pointers 707 were stored along with the random customer data associated with the payload of this prior cell. Link Pointers 707 will therefore be used as a memory address to store the random customer data within the payload of the cell corresponding to the contents of register 710.

The Packet State 706 is any indication of how far along the processing of the particular packet has progressed to date. For example, Packet State 706 may be an integer count of the number of cells that have arrived prior to the cell that corresponds to the contents of register 710. Packet State 706 is used by the Parser stage to understand which payload information corresponds to packet header information and which payload information corresponds to the packet's random data.

For example, if a particular packet type consumes the first one and a half cell payloads with header information, the Parser stage will be able to understand by reference to the Packet Type parameter and a Packet State 706 value of "1" (meaning only the first cell of the packet has been processed) that half of the current cell's payload is packet header information and the other half is packet random customer data.

Parser Stage

Figure 8:
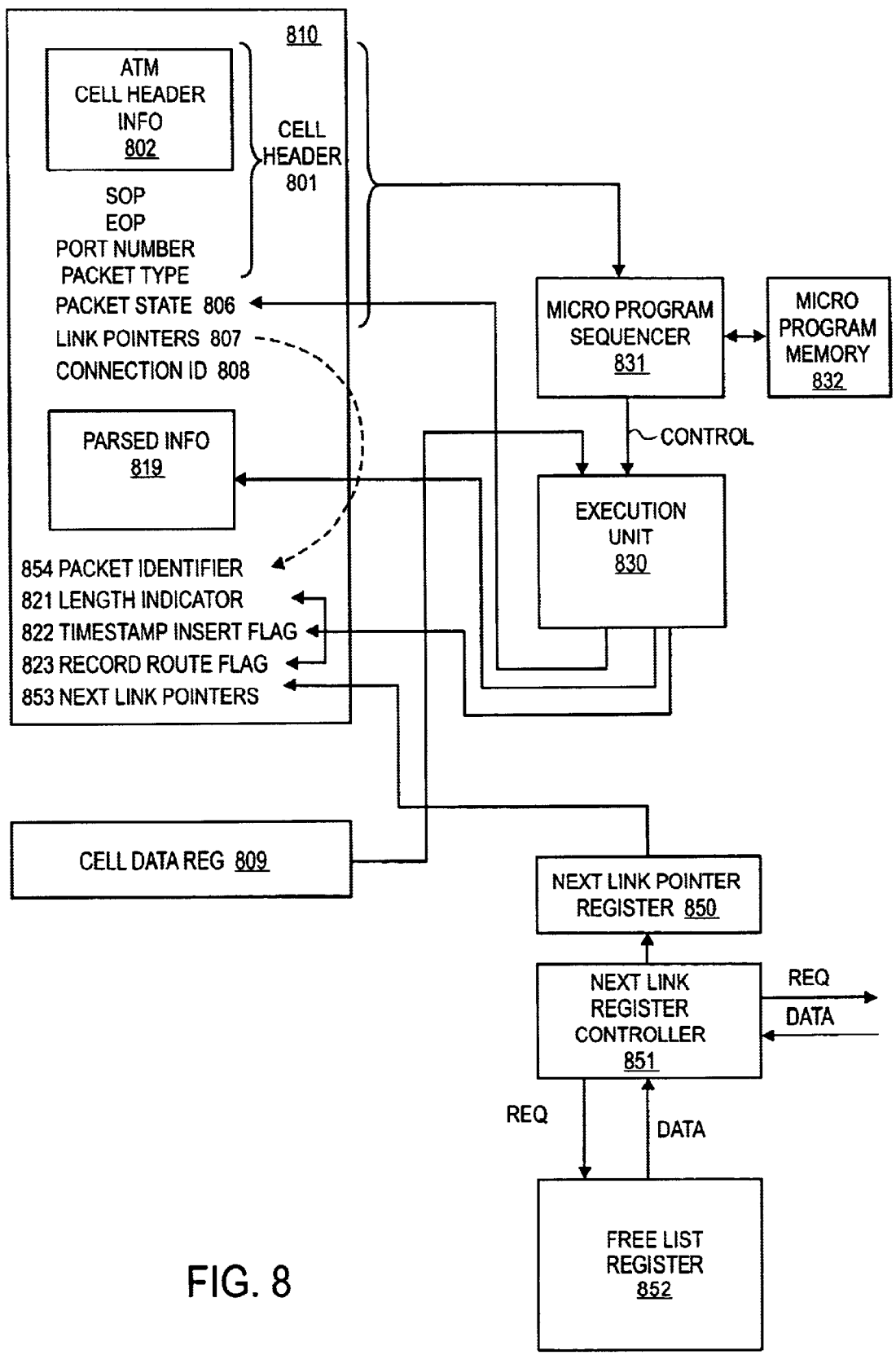
FIG. 8 shows an embodiment of the Parser stage of FIGS. 4a and 4b.

FIG. 7 shows an example of the content of control register 710 after a cell has been processed by the Get Packet State stage. The information within control register 710 (810 of FIG. 8) is then used by the Parser stage to properly distinguish between packet header information and random customer data within the cell's payload. FIG. 8 shows an exemplary design of a Parser stage.

Micro program sequencer 831, micro program memory 832 and execution unit 830 form a micro computer that runs software code used to determine the proper parsing or other processing activity (e.g., Length Indicator 304 calculation) to be performed on the cell. Micro sequencer 831 accepts the cell header information 801, and packet state 806 as input information.

Within micro program memory 832, software is stored that corresponds to the unique processes to be performed upon each packet type. That is, for example, Frame Relay packets, Packet over SONET packets, AAL5 packets are constructed differently and therefore need to be processed accordingly.

Thus, by reference to the Packet Type parameter, the proper code is loaded from micro program memory 832 into the micro program sequencer 831. For example, a software program used with AAL5 packets is loaded if the packet type parameter indicates the cell belongs to a AAL5 packet. Furthermore by reference to the packet state parameter 806, the program may be properly pointed as to where to begin micro program operation for the particular cell. That is, packet state parameter 806 may be used in one embodiment to act similar to a branch statement in a software program. If the first cell of a particular packet type has its entire payload dedicated to packet header information, the code loaded from micro program memory 832 for the first cell will be designed to identify the entire payload as control label information.

If the second cell of the same packet type has half its entire payload dedicated to control information, the code loaded from micro program memory 832 will be designed to parse the cell payload as half control label information and half random customer data. In this manner, the packet state parameter 806 may be used to load the proper code segment for a particular packet type.

Note that in many cases, once the packet's header information has been parsed, a continuous stream of cells (for that packet) will follow having only random customer data within their respective payloads. In this case, the same code (that treats the cell payload as carrying only random customer data) will be re-run for each such cell.

Micro sequencer 831, upon the loading of the proper code from micro program memory 832, sets up various control signals such that the execution unit 830 properly processes the cell payload. Execution unit 830 is logic, analagous to the logic in the execution path of a microprocessor, designed to support various operations or executions utilized by the code within micro program memory 832. Thus, execution unit 830 accepts the cell payload from the cell data register 809 as data and various control signals from micro instruction sequencer 831 to perform logic operations on the data.

When information is parsed from a cell payload it is stored in control register 810 in addition to any pre-existing parsed information from prior processed cells. Thus, execution unit 830 is configured to add to information that may be within the parsed information datafield 819 of control register 810. The execution unit 830 also updates the packet state parameter 806 to reflect that another cell has been processed (e.g., incrementing by 1 the value currently stored as the current state parameter). Where appropriate, the execution unit 830 can also be designed to calculate the Length Indicator 821, Timestamp Insert Flag 822, and Record Route Flag, 823.

The free list register 852 maintains a plurality (e.g., twenty) of free memory spaces obtained from the free space lists manager 409 of FIG. 4. The next link register controller 851 extracts a free memory address from the free list register 852 whenever the next link pointer register 850 is empty. The next link register controller 851 also monitors the status of the free list register 852. If the free list register 852 begins to significantly deplete its supply of free memory spaces, the next link register controller 851 requests more free spaces from the free space lists manager 409 of FIG. 4.

The next link pointer register 850 directs its contents to the control register 810 as a next link pointer 853 value for each cell (or whenever random customer data exists within cell data register 810 if the packet is extracted rather than copied by execution unit 830). That is, link pointer 807 is used as a memory address to store the cell payload. The next link pointer 853 is also stored along with the cell payload as the pointer. When the next cell for the particular packet is processed, the value of the next link pointer 853 reappears as the link pointer 807 consistent with properly forming a link list. Note that the cell data register 809 may contain a bit map to indicate which bits of the cell payload are representative of random customer data.

Note that during the processing of the first cell for a particular packet the link pointer value 807 should be used to create the Packet Identifier 854 (308 of FIG. 3). That is, recalling that the packet identifier corresponds to the first link list memory location for a particular packet, when the Parser recognizes the presence of a packet's first cell, the first location of the stored cell data should also be tracked as the packet identifier 854.

Note also that the cell payload should not be stored with the next link pointer 853 value when the FOP is active (since the packet is complete and the link list terminates). In this case, the next link pointer register 850 simply holds its value and waits for the next cell that can use its contents. Once the Parser stage has completed its operations, the contents of control register 810 are made available to the Write Back stage.

In alternate parser stage embodiments, the micro instruction and micro program units are replaced by additional execution units. That is, rather than execute software, dedicated logic pathways are configured for each type of packet. A particular execution unit is selected for a particular type of packet in this alternate approach which may result in parallel execution units within the Parser stage.

Write Back Stage

Figure 9:
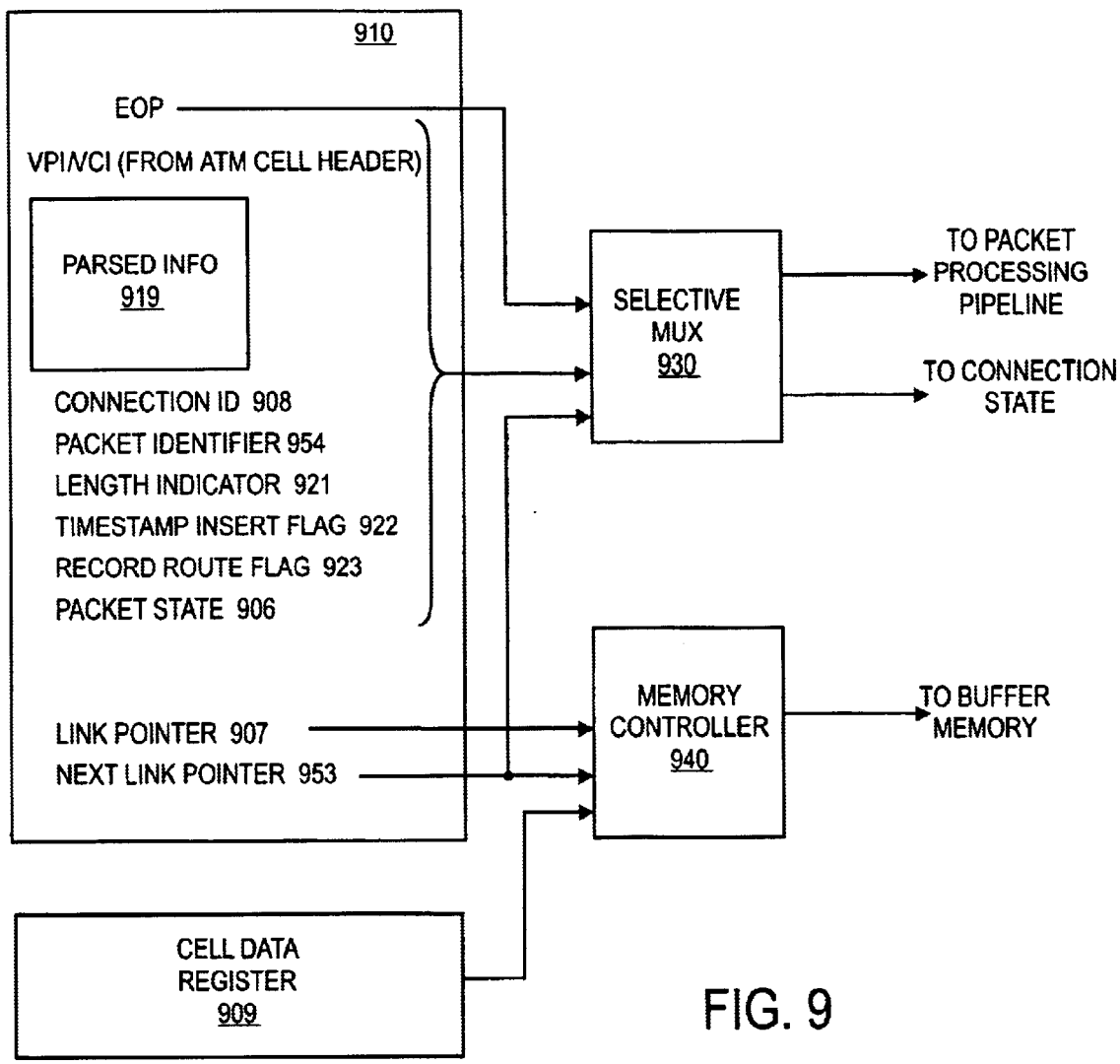
FIG. 9 shows an embodiment of the Write Back stage of FIGS. 4a and 4b.

FIG. 9 shows an exemplary design of the Write Back stage 414 of FIG. 4. The Write Back stage is designed to store the contents of the cell data register 909 (along with the next link pointer 953) into a buffer memory location provided by link pointer 907. Note that in the embodiment of FIG. 9, the entire cell data register 909 is written into buffer memory. For cells having only header information (i.e., no random customer data) or for cells partially having header information (i.e., some random customer data and some header information) this means cells may be stored in buffer memory having header information.

Note that the embodiments of FIGS. 4b, 5b, 8 and 9 effectively "copy" the packet header information embedded within a cell payload for storage into the connection state table. As such, all cell payloads are stored in buffer memory including those cell payload portions having header information rather than random customer data. In these embodiments, down stream processing logic (e.g., a packet processing pipeline or a segmentation layer) should be configured to handle packets in buffer memory having header as well as random customer data information. For simplicity use of the term parse or parsing should be construed as covering embodiments that actually parse header information from random customer data (i.e., "extract") or figuratively parse header information from random customer data (such as the copying embodiments of FIGS. 8 and 9).

Approaches that do not copy but rather extract packet header information from a cell payload are possible. In these approaches, only packet random customer data is stored by write back stage 414 into buffer memory. This requires some sort of indication from the Parser stage 408 (for the Write Back stage 414) that a cell payload has header information that should not be stored in buffer memory.

The Write Back stage may also be designed to selectively direct various parameters within control register 910 depending upon the value of the EOP parameter. Referring briefly back to FIG. 2 as an example, if the EOP parameter is active (indicating that the last cell of the packet is currently being processed by the Write Back stage), the packet has been fully sent to the networking system 200 and is ready for processing by the packet processing pipeline 240 within the networking/transport layer 206. Recall that at this point the control label 395 of FIG. 3 is then forwarded to the packet processing pipeline.

Referring to FIGS. 3 and 9, control register 910 is observed to contain the control label information 395 of FIG. 3. In the particular embodiment of FIG. 9, parsed information 919 corresponds to parsed packet header information 317 (excluding the VPI/VCI) of FIG. 3. The Connection ID 910, The Packet Identifier 954, Length Indicator 921, Timestamp Insert Flag 922 and Record Route Flag 923, along with parsed information 919 are collectively forwarded to the packet processing pipeline.

A selective multiplexor 930 is used to transfer this information (excluding the current state parameter 906) to the packet processing pipeline if EOP is active. If EOP is not active (i.e., the last cell of the packet has not been reached), the selective multiplexor can direct the Packet Identifier 954, Length Indicator 921, Timestamp Insert Flag 922, Record Route Flag 923, Packet State parameter 906 and parsed information 919 back to the connection state memory 620 of FIG. 6. The selective multiplexor 930 may also save the value of the next link pointer 953 of control register 910 into the connection state memory as the link pointer 707 of FIG. 7 in order to properly implement the link list.

Use of the term selective multiplexor is meant to include embodiments that screen out information that have already been written to the connection state memory. For example, once a packet's entire header information (or calculated control information such as the Length Indicator 721) has been written to the connection state memory, there is no need to re-write this information back into the connection state. Various selective multiplexor 930 embodiments may be designed to track old and new information within control register 910 such that "old" (or a limited amount of old) information is not continually rewritten into the connection state memory.

Hazard Prevention

Note that in the cell processing pipeline discussed so far a problem may occur if the pipeline simultaneously operates on two cells from the same packet; for example, in a case where two cells from the same packet arrive to the pipeline "back to back". Referring to FIG. 4b, consider a case where a first cell has just been processed by the Parser stage 418, a second cell has just been processed by the Get Packet State stage 413 and both cells are from the same packet.

After the next cycle tick of the pipeline, the Parser stage 418 will operate upon the second cell using "stale" connection state information (from table location 406). Since the Parser stage 418 distinguishes between random customer data and header information for a packet (e.g., by effectively "counting" locations in the packet), in this case the Parser stage 418 will lose synchronization (e.g., begin counting at the wrong number for the second cell).

That is, the Parser stage 418 has just reached a new position from which to effectively start counting because of its operation on the first stage. However, this new position was not updated into the connection state information (within table location 406) because that operation is yet to be performed by the Write Back stage 414. Unless corrected for, the Parser stage 418 will mistakenly repeat on the second cell the exact operation just performed on the first cell.

A solution to avoid this problem is to trigger the Parser stage 418 to recognize the existence of two identical Connection IDs in the Write Back stage 414 and the Get Packet State stage 413. Upon recognition of this condition (and referring briefly to FIG. 8), the Parser stage 418 may then operate on the second cell by using the control register 810 contents after the first cell has been processed. That is, use the output control register data from the first cell as input control register data for the second cell. This approach will preserve proper counting of the second cell for the parsing activity of the packet.

Design Notes to Support Layer 2, Layer 3 and Layer 4 Flows

Note that the discussion so far has pertained to the cell processing pipeline's ability to supply the packet processing pipeline with information that can be used to support Layer 3 and Layer 4 flows. Layer 3 and Layer 4 flows use information within the IP section of the packet header information 317 of FIG. 3 to route a packet through a network. The cell processing pipeline discussed above parses packet header information within a cell payload so that this information can be used by a packet processing pipeline or other networking/transport layer design to route the packet.

Layer 2 flows, however, transport packets without the use of information within the IP section of the packet header information 317 of FIG. 3. This leaves the cell header and/or Connection ID with its related information (e.g., VPI/VCI address, DLCI address, etc.) as the basis for determining the proper transportation of a packet handled according to a Layer 2 flow.

Figure 10:
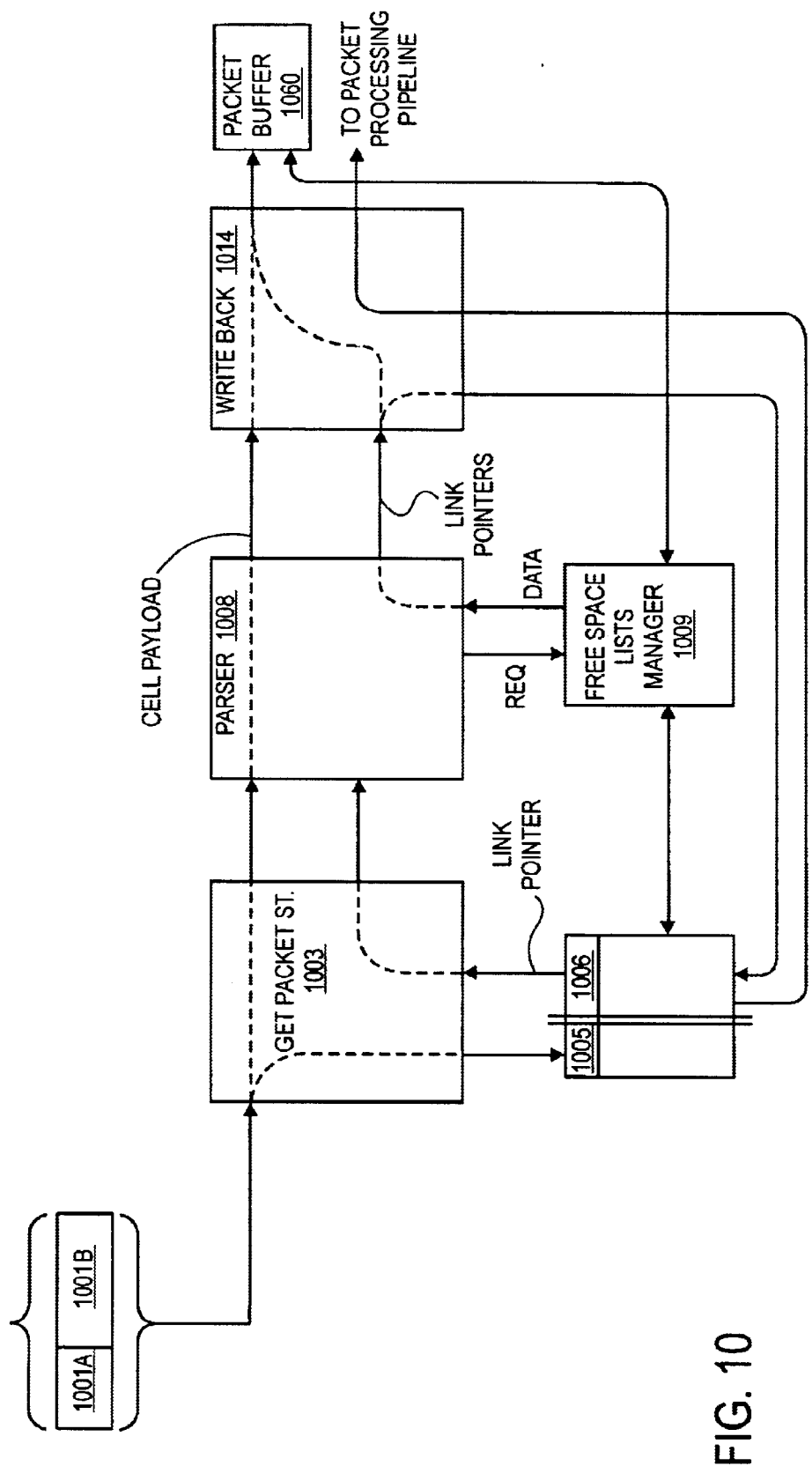
FIG. 10 shows a depiction of a cell processing pipeline supportive of Layer 2 flows.

Thus, in order to support Layer 2 flows, the cell processing pipeline does not need to perform the parsing activity described above. FIG. 10 shows an overview of the cell processing pipeline for Layer 2 flows. The Get Packet State stage 1003 operates as described with respect to FIGS. 6 and 7, with the cell header 1001a being used as a basis for a lookup that ultimately determines the connection state information for the packet. Embodiments using a first lookup to obtain a Connection ID parameter and then a second lookup to obtain the connection state information (as described with reference to FIG. 6) may be employed.

The Parser stage 1008, however, does not need to perform the packet header information parsing activity associated with a particular cell payload. Referring to FIGS. 3 and 8, since the parsed information 819 of FIG. 8 largely corresponds to the IP section of the control label information 317, the parsed information 819 is not needed for Layer 2 flows. As such, for Layer 2 flows, the Parser stage is used only to obtain the Next Link Pointers 853 and to properly generate the packet state 808 and length indicator 821.

Referring to FIG. 10, the cell payload is passed in its entirety to the Write Back stage 1014 which forwards the cell payload to the packet buffer 1060 at the appropriate memory address. This operation is consistent with the Write Back stage embodiment already discussed with respect to FIG. 9. Referring to FIGS. 9 and 10, the Write Back stage 1014 also operates as discussed above with respect to the selective multiplexor 930.

Note, however, that the connection state table is simply not loaded with parsed information 919 since the parsing activity of the parser stage is not performed. As such, the Write Back stage only stores the next link pointer 953 (as the link pointer 707 of FIG. 7) in the connection state table (along with the packet identifier 954, length. indicator 921 and packet state 906 parameters).

Figure 11A:
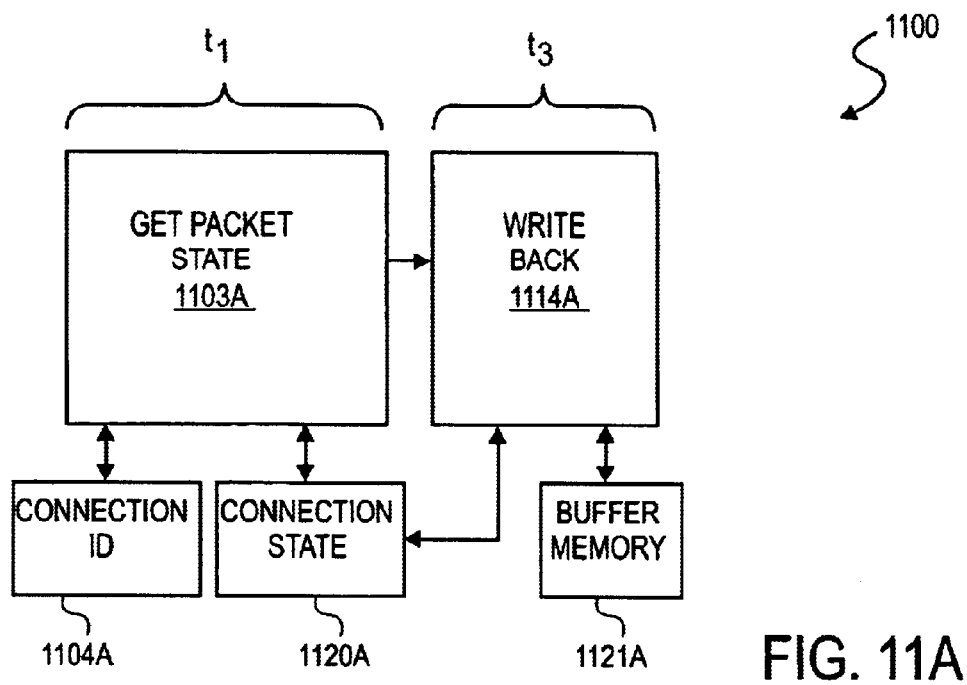
FIGS. 11a and 11b show a comparison of a cell processing pipeline for Layer 2 flows and Layer 3 and 4 flows.
Figure 11B:
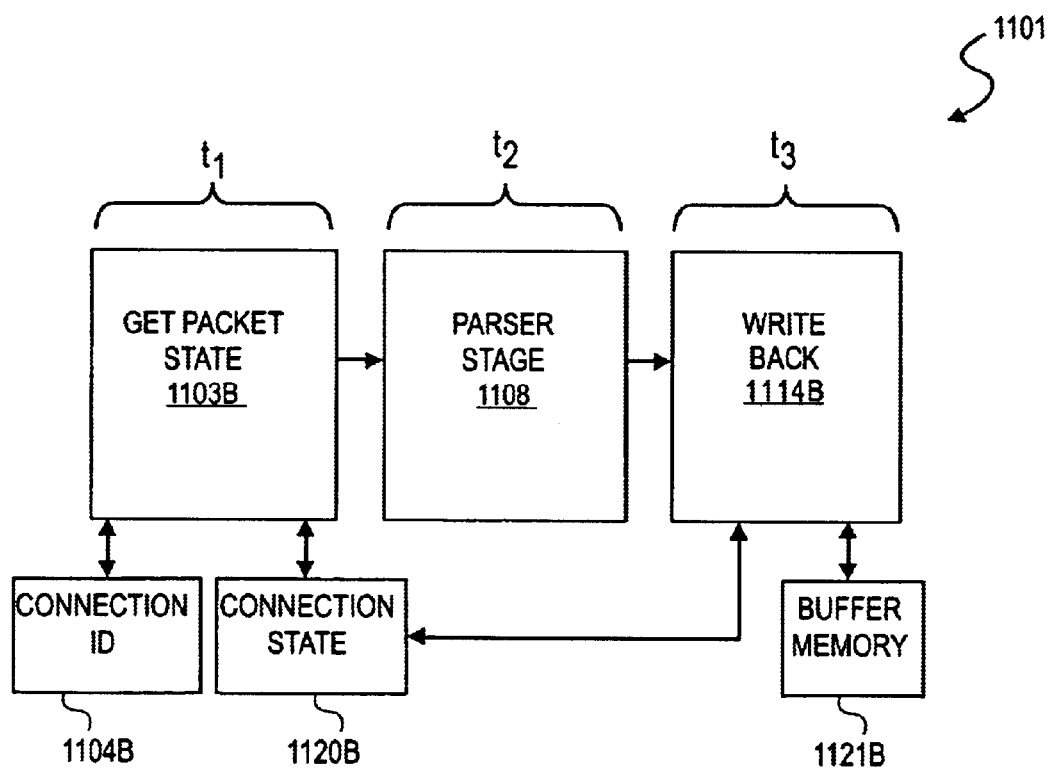

FIGS. 11a and 11b compare the operation of the cell processing pipeline for Layer 2 flows and for Layer 3 and 4 flows. FIG. 11a corresponds to the operation of the cell processing pipeline for Layer 2 flows. Note the cell processing pipeline is approximated as only having two stages since the parsing activity of the Parser stage is not performed. Since the Parser stage is only used for simplistic logic operations and next link pointer identification, the cell processing pipeline may be approximated as having only two stages: the Get Packet State stage 1103a and the Write Back stage 1114a. That is, since the speed of a pipeline is determined by the propagation delay of its slowest stage and the Parser stage's activities consume substantially less time than the other two stages, the Parser stage may be approximated as not being involved in Layer 2 flows for analyzing cell processing pipeline performance.

As example, to maintain OC-48 speeds (approximately 2.4 Gigabit/sec), a two stage pipeline can process two cells at a time with a total latency of 340 ns per cell (through the pipeline) provided each stage completes its processing within 170 ns. That is, for 53 byte cells, 2.488E9(bits/sec)/(53×8(bits/cell)) =5.868E6(cells/sec) or about 170 ns per cell. Thus, in order to support OC-48 speeds for Layer 2 flows, the Get Packet State stage 1103*a* and Write Back stage 1114*a* should be designed to each consume approximately less than 170 ns. In an embodiment, the design point is 160 ns as discussed below.

Referring to FIG. 11*a*, the latency of each stage (given symbolically as t1 and t3) is at least greater than the latency associated with the various memory reads and writes performed by each stage. For the cell processing pipeline of FIG. 11*a*, within the same 160 ns, the Connection ID table 1104*a* (which corresponds to table 604 of FIG. 6) is accessed before the Connection State table 1120*a* (which corresponds to table 620 of FIG. 6). Furthermore, the Write Back stage is configured to update (i.e., write to) the Connection State table 1120*b* (as well as update buffer memory 1121*a*) within the same 160 ns that the Get Connection State stage 1103*a* access the table 1120*b*.

In an embodiment a TCAM device having a 10 ns access time is used to implement Connection ID table 1104*a*. Furthermore, a Rambus off chip Random Access Memory (RAM) having a 1.25 ns read rate and a 1.25 ns write rate is used to implement the Connection State table 1120*a*. The RAM times include delays introduced by memory controller not shown in FIG. 11*a* for simplicity. These delays allow for a propagation delay budget of approximately 10 ns for the internal processing logic within the Get Packet State stage 1103*a* and 10 ns for the internal processing logic within the Write Back stage 1114*a* for both stages to stay within their 160 ns limit.

The Connection State table 1120*a* may be implemented as entirely "on chip", entirely "off chip" or a combination of both. On chip means table 1120*a* is located on the same semiconductor chip that implements the cell processing pipeline. Off chip means table 1120*a* is not located on the same semiconductor chip that implements the cell processing pipeline. Generally, on chip RAMs have lower read and write access times than off chip RAMs.

In embodiments having a combination of both on chip and off chip solutions for table 1120*a*, after a threshold amount of connections are stored in table 1120*a* beyond the capacity of the on chip RAM, future connections are stored in the off chip RAM. This means the latency of the pipeline increases once the threshold is reached. In one embodiment, the latency of the on chip RAM is 3 ns and the latency of the off chip RAM is 10 ns. Note that OC-48 speeds may be maintained for off chip RAM while OC-192 (approximately 9.6 Gigabit/sec) may be maintained for on chip RAM when below threshold. As transistor sizes shrink, however, the speeds for a particular architecture will increase.

Referring to FIG. 11*b*, for Layer 3 and 4 flows, the parsing activity of the Parser stage 1108 may cause the latency t2 of the Parser stage to rise above 170 ns which lowers the overall performance of the cell processing pipeline to sub OC-48 speeds. In an embodiment, the overall Parser stage 1108 latency is above 170 ns such that OC-12 speeds (approximately 622 Megabits/sec) may be maintained for Layer 3 and 4 flows.

Note also that embodiments of this invention may be implemented not only within a semiconductor chip but also within machine readable media. For example, these designs may be stored upon and/or embedded within machine readable media associated with a software design tool used for designing semiconductor devices. Examples include VHSIC Hardware Description Language (VHDL) netlists, Terilog Register Transfer Level (RTL) netlists, and transistor level (e.g., SPICE or SPICE related files) netlists. Note that such netlists may be synthesized as well as synthesizable. Machine readable media also includes media having layout information such as a GDS-II file. Furthermore, netlist files or other machine readable media for semiconductor chip design may be used in a simulation environment to perform the methods of the designs described above.

Thus, it is also to be understood that embodiments of this invention may be used as or to support software programs executed upon some form of processing core (such as the CPU of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
   a cell processing pipeline comprising a plurality of pipeline stages, said cell processing pipeline further comprising a pipeline stage to, within a pipeline cycle,
   1) parse a payload of a cell if said cell payload carries a portion of a packet's header and a portion of said packet's payload;
   2) determine packet state information, where, whether or not a following cell that carries a next portion of said packet carries a portion of said packet's header can be determined from said packet state information;
   said pipeline stage further comprising, to said parse and to said determine, a micro program sequencer and an execution unit coupled to said micro program sequencer, said pipeline stage coupled to a register, said register to provide said packet state information back to said pipeline stage if a next cell to be evaluated for parsing by said pipeline stage within a next pipeline cycle after said pipeline cycle is also said following cell.

2. The apparatus of claim 1 further comprising first register space and second register space, said first register space to store information that identifies a connection over which said cell arrived, said second register space to store information that identifies a connection over which said next cell arrived, said register to provide said packet state information back to said pipeline stage if the contents of said first and second register spaces indicate the same connection so as to indicate said next cell is also said following cell.

3. The apparatus of claim 2 wherein said first register space is accessible to a first pipeline stage that precedes said pipeline stage in said pipeline, and wherein, said second register space is accessible to a third pipeline stage that follows said pipeline stage in said pipeline.

4. The apparatus of claim 3 wherein said first and third pipeline stages are coupled to a memory, said memory to store packet state information determined by said pipeline stage upon its being sent from said third pipeline stage, said memory to provide said packet state information to said first pipeline stage upon said following cell being presented to said pipeline.

5. The apparatus of claim 4 wherein said memory is to further to store, along with said packet state information, said packet header portion parsed by said pipeline stage upon its being sent from said third pipeline stage, said memory to also provide said packet header portion to said first pipeline stage upon said following cell being said presented to said pipeline.

6. The apparatus of claim 5 further comprising a second memory coupled to said first stage, said second memory to provide said information that identifies a connection over which said cell arrived in response to a parameter associated with said cell.

7. The apparatus of claim 6 wherein said parameter is said cell's VPI/VCI.

8. The apparatus of claim 7 wherein said second memory is a content addressable memory (CAM).

9. The apparatus of claim 1 further comprising a first pipeline stage that precedes said pipeline stage in said pipeline and a third pipeline stage that follows said pipeline stage in said pipeline, said first and third pipeline stages coupled to a memory, said memory to store packet state information determined by said pipeline stage upon its being sent from said third pipeline stage, said memory to provide said packet state information to said first pipeline stage upon said following cell being presented to said pipeline.

10. The apparatus of claim 9 wherein said memory is to further to store, along with said packet state information, said packet header portion parsed by said pipeline stage upon its being sent from said third pipeline stage, said memory to also provide said packet header portion to said first pipeline stage upon said following cell being said presented to said pipeline.

11. The apparatus of claim 9 further comprising a second memory coupled to said first stage, said second memory to provide information that identifies a connection over which said cell arrived in response to a parameter associated with said cell.

12. The apparatus of claim 11 said parameter is said cell's VPI/VCI.

13. The apparatus of claim 11 wherein said second memory is a content addressable memory (CAM).

14. The apparatus of claim 1 wherein said packet state information includes a cell count that tracks how many cells of said packet have been evaluated for parsing by said pipeline stage.

15. The apparatus of claim 1 further comprising a micro-program memory coupled to said sequencer, said micro-program memory to store micro-programs that are executable by said pipeline stage.

16. The apparatus of claim 15 wherein at least one of said micro-programs is to be executed by said pipeline stage for cells carrying a portion of a specific type of packet.

17. The apparatus of claim 16 wherein said specific type of packet is IP.

18. The apparatus of claim 16 wherein said specific type of packet is MPLS.

19. The apparatus of claim 16 wherein said specific type of packet is Frame Relay.

20. The apparatus of claim 16 wherein said specific type of packet is AAL0.

21. The apparatus of claim 16 wherein said specific type of packet is AAL5.

22. The apparatus of claim 16 wherein said specific type of packet is Packet Over SONET.

23. The apparatus of claim 22 wherein said at least one of said micro-programs contains instructions sufficient for said pipeline stage to determine at least one of the following:
   a) a length indicator;
   b) a timestamp insert flag;
   c) a record route flag.

24. The apparatus of claim 1 wherein said pipeline stage further comprises an interface to a free space lists manager so that a pointer can be retrieved within said pipeline cycle, said pointer to point to a location in a packet buffer where payload information (if any) of said packet carried by said following cell will be written into said packet buffer.

25. The apparatus of claim 24 further comprising register space accessible to said pipeline stage to which said pipeline stage provides said pointer, said packet state information and any parsed portion of said packet's header.

26. The apparatus of claim 24 wherein said pipeline further comprises a following pipeline stage relative to said pipeline stage, said following pipeline stage coupled to said packet buffer so that said packet payload information (if any) carried by said following cell can be written to said location in said packet buffer pointed to by said pointer.

27. The apparatus of claim 26 further comprising another pipeline stage that precedes said pipeline stage in said pipeline, said following and another pipeline stages coupled to a memory, said memory to store packet state information determined by said pipeline stage upon its being sent from said following pipeline stage, said memory to provide said packet state information to said another pipeline stage upon said following cell being presented to said pipeline.

28. The apparatus of claim 1 wherein said pipeline stage does not said parse for Layer 2 flows.

29. A method, comprising:
   a) within a first cycle of a pipeline:
      parsing a cell payload if said cell payload carries a portion of a packet's header and a portion of said packet's payload;
      determining packet state information for said packet, where, whether or not a following cell that carries a next portion of said packet carries a portion of said packet's header can be determined from said packet state information; and,
   b) within a second cycle of said pipeline that immediately follows said first cycle and as a consequence of recognizing that a next cell that immediately follows said cell in the processing sequences of said pipeline is said following cell:
      using said packet state information to determine whether or not said next cell carries a portion of said packet's header.

30. The method of claim 29 further comprising within said first cycle:
   looking up a connection that said next cell arrived on.

31. The method of claim 30 wherein an input parameter for said looking up employs at least a portion of said next cell's header.

32. The method of claim 30 wherein said recognizing further comprises recognizing that said connection is the same connection that said cell arrived on.

33. The method of claim 29 further comprising executing a micro program to perform said parsing and said determining within said first pipeline cycle.

34. The method of claim 33 wherein said micro program is specific to the specific type of said packet.

35. The method of claim 34 wherein said specific type of packet is IP.

36. The method of claim 34 wherein said specific type of packet is MPLS.

37. The method of claim 34 wherein said specific type of packet is Frame Relay.

38. The method of claim 34 wherein said specific type of packet is AAL0.

39. The method of claim 34 wherein said specific type of packet is AAL5.

40. The method of claim 34 wherein said specific type of packet is Packet Over SONET.

41. The method of claim 29 further comprising retrieving, within said first pipeline cycle, a pointer that identifies where payload information (if any) of said packet carried by said following cell will be written into a buffer memory.

42. The method of claim 41 further comprising writing payload information of said packet carried by said following cell into said buffer memory after said second pipeline cycle.

43. The method of claim 42 further comprising performing said writing during a third pipeline cycle that immediately follows said second pipeline cycle.

44. The method of claim 43 further comprising, during said second pipeline cycle, updating said packet state information for said packet, so that, it can be determined whether or not a second following cell that carries a second next portion of said packet carries a portion of said packet's header.

45. The method of claim 44 further comprising writing said updated packet state information into a memory during said third pipeline cycle.

46. The method of claim 45 further comprising looking up said updated packet state information with a term associated with said second following cell as a consequence of said second following cell being presented to said pipeline for processing.

47. The method of claim 46 where said term at least includes said cell's VPI/VCI information.

48. The method of claim 29 further comprising, during said second pipeline cycle, updating said packet state information for said packet, so that, it can be determined whether or not a second following cell that carries a second next portion of said packet carries a portion of said packet's header.

49. The method of claim 48 further comprising writing said updated packet state information into a memory during said third pipeline cycle.

50. The method of claim 49 further comprising looking up said updated packet state information with a term associated with said second following cell as a consequence of said second following cell being presented to said pipeline for processing.

51. The method of claim 50 where said term at least includes said cell's VPI/VCI information.

52. An apparatus, comprising:
a) means for, within a first cycle,
parsing a cell payload if said cell payload carries a portion of a packet's header and a portion of said packet's payload;
determining packet state information for said packet, where, whether or not a following cell that carries a next portion of said packet carries a portion of said packet's header can be determined from said packet state information; and,
b) means for, within a second cycle that immediately follows said first cycle and as a consequence of recognizing that a next cell that immediately follows said cell in a series of pipelined processing sequences is said following cell,
using said packet state information to determine whether or not said next cell carries a portion of said packet's header.

53. The apparatus of claim 52 further comprising means for, within said first cycle, looking up a connection that said next cell arrived on.

54. The apparatus of claim 52 further comprising means for retrieving, within said first cycle, a pointer that identifies where payload information (if any) of said packet carried by said following cell will be written into a buffer memory.

55. The apparatus of claim 52 further comprising means for writing said updated packet state information into a memory during a third cycle that immediately follows said second cycle.

56. The apparatus of claim 52 further comprising means for, during said second cycle, updating said packet state information for said packet, so that, it can be determined whether or not a second following cell that carries a second next portion of said packet carries a portion of said packet's header.

57. The apparatus of claim 56 further comprising means for writing said updated packet state information into a memory during a third cycle that immediately follows said second cycle.

58. A machine readable medium containing a description of a design for a semiconductor circuit, said circuit comprising:
a cell processing pipeline comprising a plurality of pipeline stages, said cell processing pipeline further comprising a pipeline stage to, within a pipeline cycle,
1) parse a payload of a cell if said cell payload carries a portion of a packet's header and a portion of said packet's payload;
2) determine packet state information, where, whether or not a following cell that carries a next portion of said packet carries a portion of said packet's header can be determined from said packet state information;
said pipeline stage further comprising, to said parse and to said determine, a micro program sequencer and an execution unit coupled to said micro program sequencer, said pipeline stage coupled to a register, said register to provide said packet state information back to said pipeline stage if a next cell to be evaluated for parsing by said pipeline stage within a next pipeline cycle after said pipeline cycle is also said following cell.

59. The machine readable medium of claim 58 wherein said circuit further comprises first register space and second register space, said first register space to store information that identifies a connection over which said cell arrived, said second register space to store information that identifies a connection over which said next cell arrived, said register to provide said packet state information back to said pipeline stage if the contents of said first and second register spaces indicate the same connection so as to indicate said next cell is also said following cell.

60. The machine readable medium of claim 59 wherein said first register space is accessible to a first pipeline stage that precedes said pipeline stage in said pipeline, and wherein, said second register space is accessible to a third pipeline stage that follows said pipeline stage in said pipeline.

61. The machine readable medium of claim 58 of wherein said circuit is described in VHDL.

62. The machine readable medium of claim 58 wherein said circuit is described at a Register Transfer Level (RTL).

63. A networking system, comprising:
  a packet aggregation layer to perform cell reassembly, said packet aggregation layer comprising:
    a cell processing pipeline comprising a plurality of pipeline stages, said cell processing pipeline further comprising a pipeline stage to, within a pipeline cycle,
      1) parse a payload of a cell if said cell payload carries a portion of a packet's header and a portion of said packet's payload;
      2) determine packet state information, where, whether or not a following cell that carries a next portion of said packet carries a portion of said packet's header can be determined from said packet state information;
    said pipeline stage further comprising, to said parse and to said determine, a micro program sequencer and an execution unit coupled to said micro program sequencer, said pipeline stage coupled to a register, said register to provide said packet state information back to said pipeline stage if a next cell to be evaluated for parsing by said pipeline stage within a next pipeline cycle after said pipeline cycle is also said following cell.

64. The networking system of claim 63 wherein said packet aggregation layer further comprises first register space and second register space, said first register space to store information that identifies a connection over which said cell arrived, said second register space to store information that identifies a connection over which said next cell arrived, said register to provide said packet state information back to said pipeline stage if the contents of said first and second register spaces indicate the same connection so as to indicate said next cell is also said following cell.

65. The networking system of claim 64 wherein said first register space is accessible to a first pipeline stage that precedes said pipeline stage in said pipeline, and wherein, said second register space is accessible to a third pipeline stage that follows said pipeline stage in said pipeline.

66. The networking system of claim 65 wherein said first and third pipeline stages are coupled to a memory, said memory to store packet state information determined by said pipeline stage upon its being sent from said third pipeline stage, said memory to provide said packet state information to said first pipeline stage upon said following cell being presented to said pipeline.

67. The networking system of claim 66 wherein said memory is to further to store, along with said packet state information, said packet header portion parsed by said pipeline stage upon its being sent from said third pipeline stage, said memory to also provide said packet header portion to said first pipeline stage upon said following cell being said presented to said pipeline.

68. The networking system of claim 67 further comprising a second memory coupled to said first stage, said second memory to provide said information that identifies a connection over which said cell arrived in response to a parameter associated with said cell.

69. The networking system of claim 68 wherein said parameter is said cell's VPI/VCI.

70. The networking system of claim 69 wherein said second memory is a content addressable memory (CAM).

71. The networking system of claim 63 further comprising a first pipeline stage that precedes said pipeline stage in said pipeline and a third pipeline stage that follows said pipeline stage in said pipeline, said first and third pipeline stages coupled to a memory, said memory to store packet state information determined by said pipeline stage upon its being sent from said third pipeline stage, said memory to provide said packet state information to said first pipeline stage upon said following cell being presented to said pipeline.

72. The networking system of claim 71 wherein said memory is to further to store, along with said packet state information, said packet header portion parsed by said pipeline stage upon its being sent from said third pipeline stage, said memory to also provide said packet header portion to said first pipeline stage upon said following cell being said presented to said pipeline.

73. The networking system of claim 63 wherein said packet state information includes a cell count that tracks how many cells of said packet have been evaluated for parsing by said pipeline stage.

74. The networking system of claim 63 further comprising a micro-program memory coupled to said sequencer, said micro-program memory to store micro-programs that are executable by said pipeline stage.

75. The networking system of claim 74 wherein at least one of said micro-programs is to be executed by said pipeline stage for cells carrying a portion of a specific type of packet.

76. The networking system of claim 74 wherein said at least one of said micro-programs contains instructions sufficient for said pipeline stage to determine at least one of the following:
  a) a length indicator;
  b) a timestamp insert flag;
  c) a record route flag.

77. The networking system of claim 63 wherein said pipeline stage further comprises an interface to a free space lists manager so that a pointer can be retrieved within said pipeline cycle, said pointer to point to a location in a packet buffer where payload information (if any) of said packet carried by said following cell will be written into said packet buffer.

\* \* \* \* \*